United States Patent
Wodrich et al.

(10) Patent No.: US 10,897,680 B2
(45) Date of Patent: Jan. 19, 2021

(54) ORIENTATION-BASED DEVICE INTERFACE

(71) Applicant: GOOGLE LLC, Mountain View, CA (US)

(72) Inventors: Justin Wodrich, Los Gatos, CA (US); Rolando Esparza Palacios, San Francisco, CA (US); Nicholas Matarese, San Francisco, CA (US); Michael B. Montvelishsky, Burlingame, CA (US); Rasmus Munk Larsen, San Jose, CA (US); Benjamin Louis Shaya, Mountain View, CA (US); Che-Yu Kuo, Milpitas, CA (US); Michael Smedegaard, Danville, CA (US); Richard F. Lyon, Los Altos, CA (US); Gabriel Fisher Slotnick, Mountain View, CA (US); Kristen Mangum, San Mateo, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/138,707

(22) Filed: Sep. 21, 2018

(65) Prior Publication Data
US 2019/0104373 A1   Apr. 4, 2019

Related U.S. Application Data

(63) Continuation-in-part of application No. 16/058,820, filed on Aug. 8, 2018.
(Continued)

(51) Int. Cl.
*H04R 29/00* (2006.01)
*G06F 3/16* (2006.01)
(Continued)

(52) U.S. Cl.
CPC .......... *H04R 29/001* (2013.01); *G06F 3/165* (2013.01); *F21V 33/0056* (2013.01);
(Continued)

(58) Field of Classification Search
CPC ...... H04R 29/001; H04R 1/406; H04R 3/005; H04R 5/02; H04R 5/04; H04R 2420/07;
(Continued)

(56) References Cited

U.S. PATENT DOCUMENTS

| 4,340,780 A | 7/1982 | Odlen |
| 8,676,728 B1 | 3/2014 | Velusamy et al. |

(Continued)

FOREIGN PATENT DOCUMENTS

| WO | WO 2012/040363 | * | 3/2012 |
| WO | WO 2012/040363 A1 | | 3/2012 |
| WO | WO 2018/026799 A1 | | 2/2018 |

OTHER PUBLICATIONS

Google LLC, International Search Report/Written Opinion, PCT/US2018/042345, dated Dec. 21, 2018, 19 pgs.
(Continued)

*Primary Examiner* — Norman Yu
(74) *Attorney, Agent, or Firm* — Morgan, Lewis & Bockius LLP

(57) ABSTRACT

The various implementations described herein include methods, devices, and systems for automatic audio equalization. In one aspect, a method is performed at an audio device having one or more processors, memory, and a plurality of device interface elements, including one or more speakers and a plurality of microphones. The method includes: (1) detecting a change in orientation of the audio device from a first orientation to a second orientation; and (2) in response to detecting the change in orientation, configuring operation of two or more of the plurality of device interface elements.

20 Claims, 17 Drawing Sheets

Related U.S. Application Data

(60) Provisional application No. 62/568,216, filed on Oct. 4, 2017, provisional application No. 62/568,219, filed on Oct. 4, 2017.

(51) Int. Cl.

| | | |
|---|---|---|
| H04R 1/40 | (2006.01) | |
| H04R 3/00 | (2006.01) | |
| F21Y 115/10 | (2016.01) | |
| H04R 5/02 | (2006.01) | |
| F21V 33/00 | (2006.01) | |
| H04R 5/04 | (2006.01) | |
| H04R 3/04 | (2006.01) | |

(52) U.S. Cl.
CPC ........... *F21Y 2115/10* (2016.08); *H04R 1/403* (2013.01); *H04R 1/406* (2013.01); *H04R 3/005* (2013.01); *H04R 3/04* (2013.01); *H04R 5/02* (2013.01); *H04R 5/04* (2013.01); *H04R 2420/07* (2013.01); *H04R 2430/03* (2013.01)

(58) Field of Classification Search
CPC ... G06F 3/165; F21Y 2115/10; F21V 33/0056
USPC ... 381/56, 10, 11, 300, 303–305, 58–59, 92, 381/98–103, 123
See application file for complete search history.

(56) References Cited

U.S. PATENT DOCUMENTS

| | | |
|---|---|---|
| 9,521,497 B2 | 12/2016 | Schuster et al. |
| 9,763,018 B1 | 9/2017 | McPherson |
| 9,992,595 B1 | 6/2018 | Choisel et al. |
| 10,459,684 B2 | 10/2019 | Shih et al. |
| 2003/0235318 A1 | 12/2003 | Bharitkar et al. |
| 2005/0031129 A1 | 2/2005 | Devantier et al. |
| 2005/0195984 A1 | 9/2005 | Miura |
| 2007/0025557 A1 | 2/2007 | Nackvi et al. |
| 2008/0219470 A1 | 9/2008 | Kimijima |
| 2011/0103590 A1 | 5/2011 | Christoph et al. |
| 2011/0163972 A1* | 7/2011 | Anzures ............... G06F 3/04883 345/173 |
| 2012/0183165 A1 | 7/2012 | Foo et al. |
| 2014/0064492 A1 | 3/2014 | Lakkundi et al. |
| 2014/0185852 A1* | 7/2014 | Pereira .................... H04R 5/04 381/333 |
| 2015/0163616 A1 | 6/2015 | Chatterjee |
| 2015/0289076 A1* | 10/2015 | Zhu ......................... H04R 3/12 381/300 |
| 2015/0341729 A1* | 11/2015 | Meskens |
| 2016/0219392 A1* | 7/2016 | Vilermo .................. H04R 5/02 |
| 2016/0315384 A1* | 10/2016 | van Erven ............... H04R 3/12 |
| 2016/0366517 A1 | 12/2016 | Chandran et al. |
| 2017/0025873 A1* | 1/2017 | Fathollahi ............. H02J 7/0045 |
| 2017/0188167 A1 | 6/2017 | Scott |
| 2017/0280223 A1* | 9/2017 | Cavarra ............... H04R 1/1041 |
| 2017/0295440 A1 | 10/2017 | Gran et al. |
| 2018/0063626 A1 | 3/2018 | Pong |
| 2018/0098167 A1* | 4/2018 | Welch .................. H04R 29/005 |
| 2018/0364901 A1* | 12/2018 | Fan ..................... G06F 3/04883 |
| 2019/0075414 A1 | 3/2019 | Bush |

OTHER PUBLICATIONS

Google LLC, International Search Report/Written Opinion, PCT/US2019/045703, dated Nov. 14, 2019, 9 pgs.

Google LLC, International Preliminary Report on Patentability, PCT/US2018/042345, Apr. 8, 2020, 13 pages.

\* cited by examiner

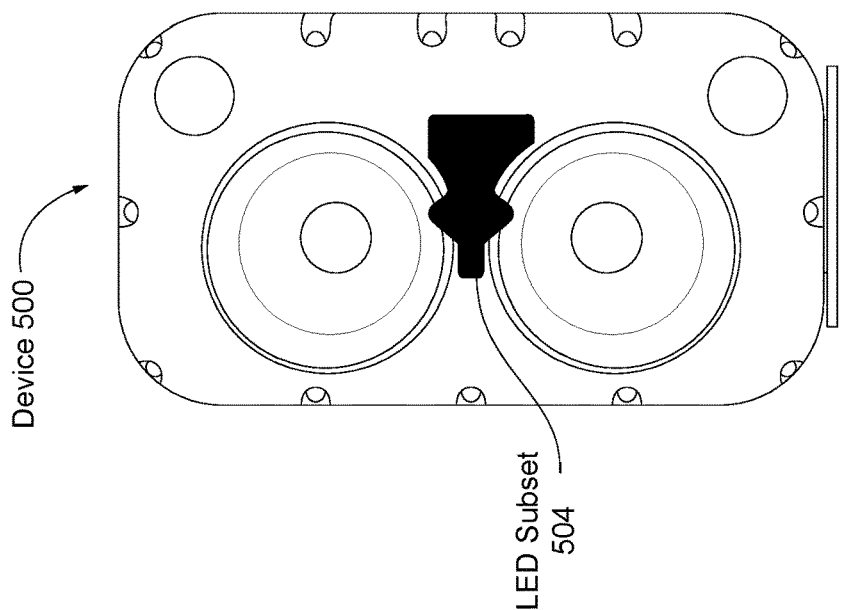
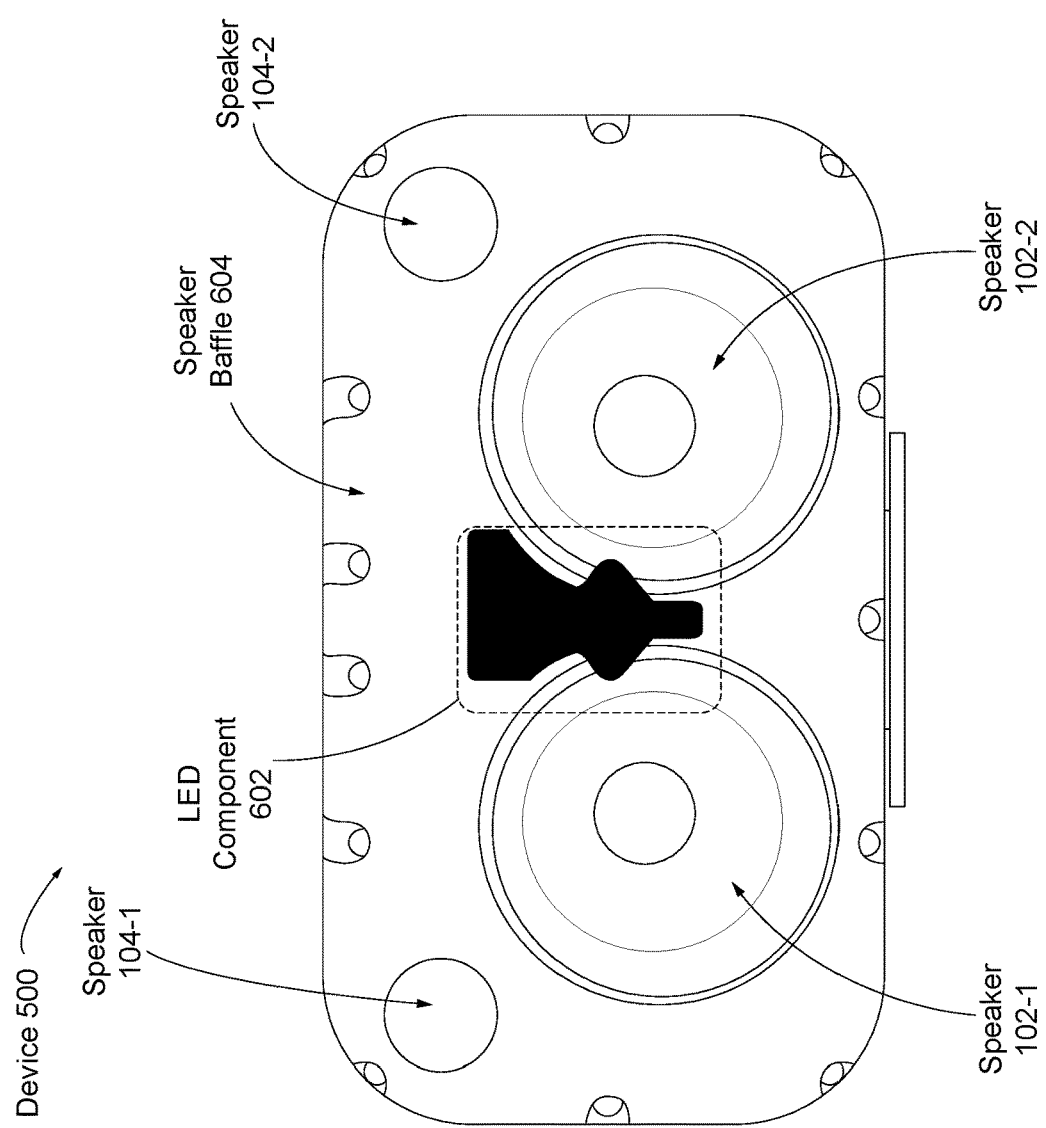

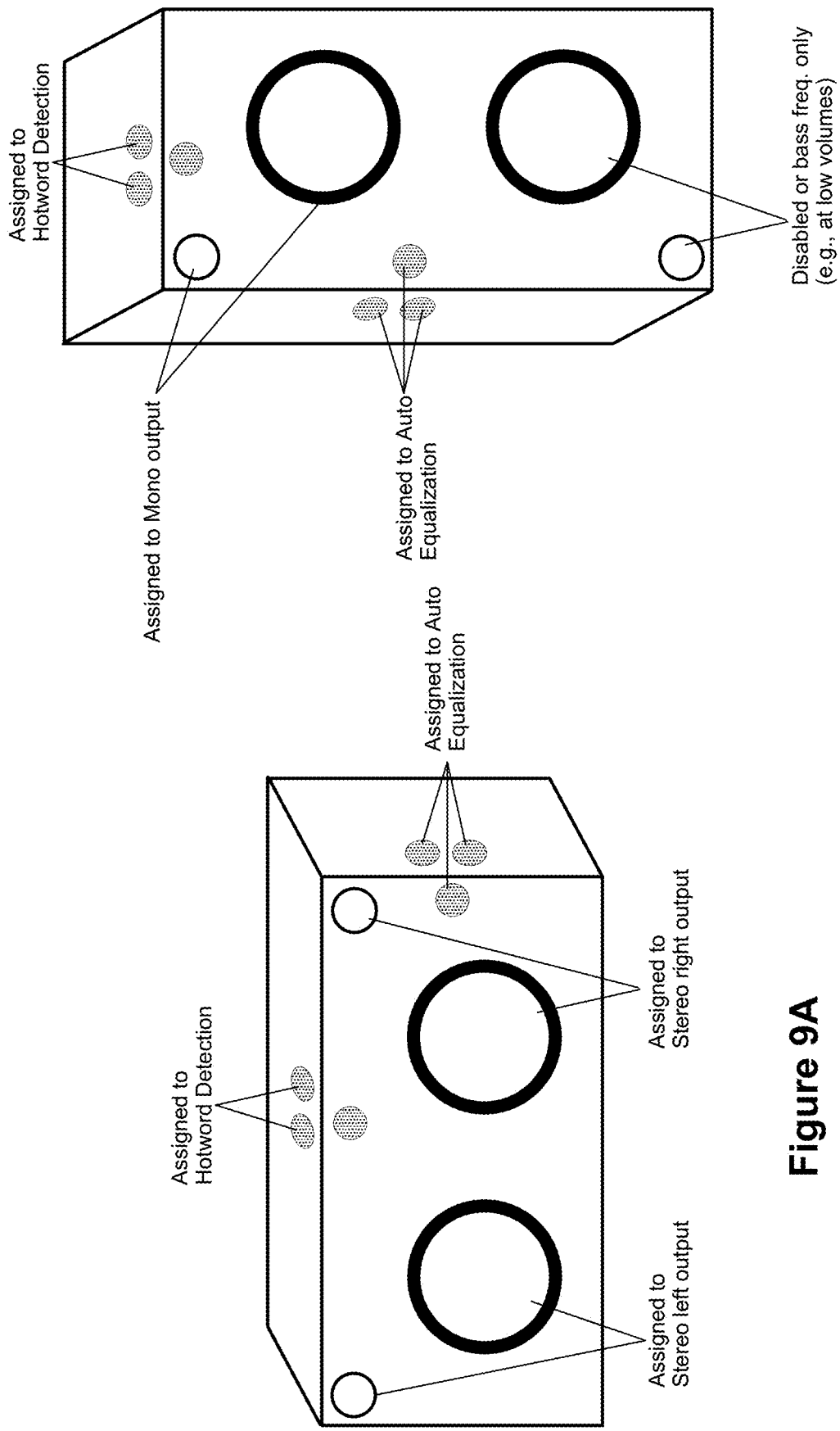

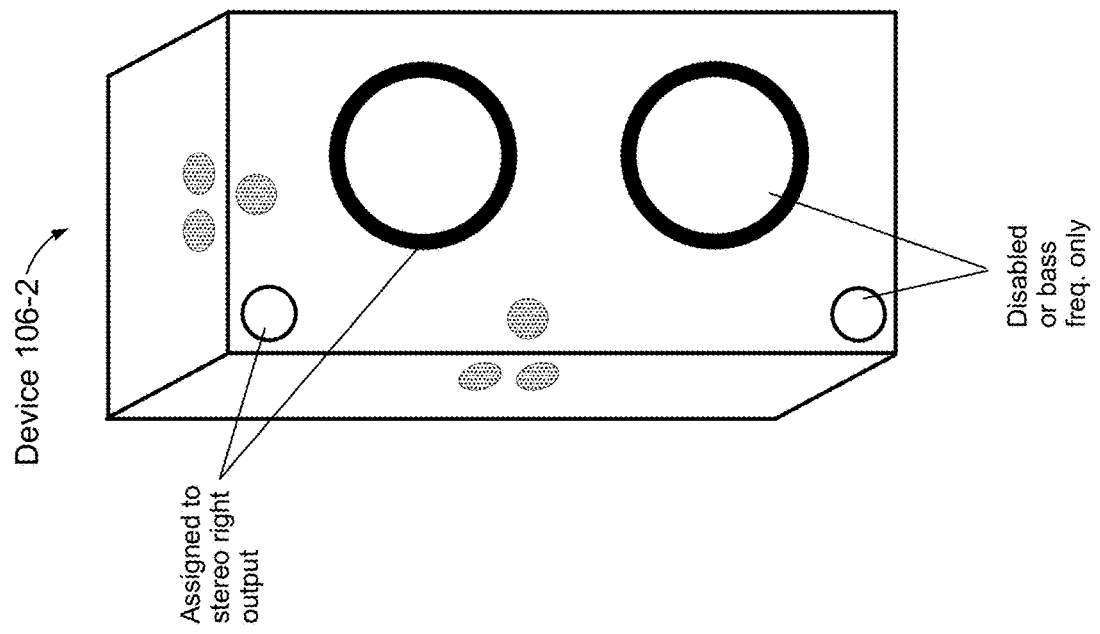
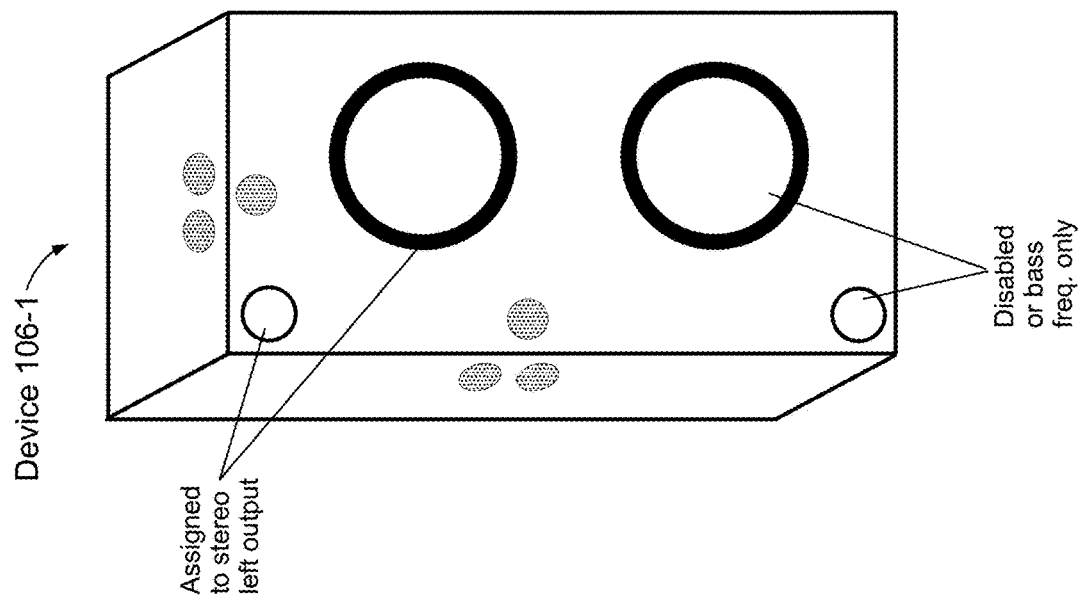
Figure 10B

ORIENTATION-BASED DEVICE INTERFACE

PRIORITY AND RELATED APPLICATIONS

This application is a continuation-in-part of U.S. application Ser. No. 16/058,820, filed Aug. 8, 2018, entitled "Methods and Systems for Automatically Equalizing Audio Output based on Room Characteristics," which claims priority to U.S. Provisional Patent Application No. 62/568,216, filed Oct. 4, 2017, entitled "Methods and Systems for Automatically Equalizing Audio Output based on Room Characteristics," and U.S. Provisional Patent Application No. 62/568,219, filed Oct. 4, 2017, entitled "Methods and Systems for Automatically Equalizing Audio Output based on Room Position," each of which is incorporated by reference herein in its entirety.

This application is related to U.S. application Ser. No. 16/058,885, filed Aug. 8, 2018, entitled "Methods and Systems for Automatically Equalizing Audio Output based on Room Position," which is incorporated by reference herein in its entirety.

TECHNICAL FIELD

This relates generally to audio devices, including but not limited to orientation-based device interfaces on audio devices.

BACKGROUND

Traditionally electronic devices are designed and manufactured to have a single orientation, e.g., a single mounting surface. Recently, some devices are designed to operate in multiple orientations, such as vertically and horizontally. However, it can be cumbersome and unintuitive for users to manipulate the device interface in the various orientations. Accordingly, it is desirable for electronic devices to have orientation-based device interfaces.

SUMMARY

There is a need for methods, devices, and systems for implementing orientation-base device interfaces. Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to automatically adjust operation of a device interface in accordance with orientation changes.

To maximize user experience and convenience, the audio devices described herein are operable at multiple orientations. For example, an audio device with two speakers is configured to operate in a stereo mode when oriented horizontally and is configured to operate in a mono mode when oriented vertically. The audio device optionally includes a detachable mount (e.g., a silicone foot) that is adapted to attach to two sides of the audio device (e.g., with magnets). The audio device optionally includes a set of light emitting diodes (LEDs) where different subsets of the LEDs are used based on the orientation (e.g., such that the LEDs maintain a horizontal appearance in both orientations). The audio device optionally includes a swipe strip (e.g., to control volume) configured to interpret directionality of user swipes based on the devices orientation. For example, a swipe from a first end to a second end of the strip corresponds to an increase in volume in the horizontal orientation. However, in this example, a swipe from the first end to the second end corresponds to a decrease in volume in the vertical orientation. The audio device also optionally adjusts operation of its microphones based on orientation. For example, the microphones furthest from the mount are used for hotword detection, e.g., as those microphones are better positioned to obtain a clear audio signal.

(A1) In one aspect, some implementations include a method for adjusting to device orientation performed at an audio device having one or more processors, memory, and a plurality of device interface elements, including one or more speakers and a plurality of microphones. The method includes: (1) detecting a change in orientation of the audio device from a first orientation to a second orientation; and (2) in response to detecting the change in orientation, configuring operation of two or more of the plurality of device interface elements. In some implementations, detecting a change in orientation comprises using an accelerometer of the audio device to detect the change in orientation. As used herein, an audio device is an electronic device with one or more speakers and/or one or more microphones.

(A2) In some implementations of A1: (1) further comprising, prior to detecting the change in orientation, operating the audio device in the first orientation; and (2) where configuring the operation of the two or more device interface elements comprises reconfiguring the operation based on the change in orientation.

(A3) In some implementations of A1 or A2, where the first orientation corresponds to the audio device being positioned on (e.g., resting on) a first side of the audio device; and where the second orientation corresponds to the audio device being positioned on a second side of the audio device, distinct from the first side (e.g., the change in orientation corresponds to rotating the device from a vertical orientation to a horizontal orientation).

(A4) In some implementations of A1-A3, where configuring the operation of two or more of the plurality of device interface elements includes assigning a first microphone of the plurality of microphones to a task based on the change in orientation. In some implementations, a first subset of the microphones is used in the first orientation and a second subset is used in the second orientation (e.g., microphones on the "top" of the device in each orientation are used for hotword detection).

(A5) In some implementations of A4, further comprising, in response to detecting the change in the orientation, unassigning a second microphone of the plurality of microphones from the task.

(A6) In some implementations of A4 or A5, where the task includes one or more of: hotword detection, speech recognition, and audio equalization.

(A7) In some implementations of A1-A6, where the plurality of device interface element includes a volume control element; and where configuring the operation of two or more of the plurality of device interface elements includes configuring operation of the volume control element.

(A8) In some implementations of A7, where, while in the first orientation, movement along the volume control element toward a first end of the volume control element corresponds to increasing volume of the one or more speakers; and where configuring the operation of the volume control element comprises configuring the volume control element so that movement along the volume control element toward the first end of the volume control element corresponds to decreasing the volume of the one or more speakers. In some implementations, the volume control includes a capacitive touch element (e.g., a capacitive touch strip).

(A9) In some implementations of A1-A8, where the one or more speakers comprises a plurality of speakers; and where configuring the operation of two or more of the plurality of device interface elements includes configuring operation of the plurality of speakers (e.g., adjusting treble and/or bass settings for the speakers).

(A10) In some implementations of A9, where, while in the first orientation, the plurality of speakers is configured to operate in a stereo mode; and where configuring the operation of the plurality of speakers includes reconfiguring the plurality of speakers to operate in a mono mode. In some implementations, the audio output is time slewed upon determining an orientation change. In some implementations, audio output is faded to silence briefly prior to reconfiguration of subsequent output. In some implementations, different audio filters (e.g., biquad or ladder filters) are used to reconfigure the subsequent output.

(A11) In some implementations of A10, wherein reconfiguring the plurality of speakers to operate in a mono mode comprises utilizing only a subset of the plurality of speakers for a subsequent audio output. For example, in a vertical orientation, only the upper speakers are used (e.g., an upper woofer and upper tweeter. In some implementations, the subsequent audio output comprises TTS output or music. In some implementations, gain of the subset of speakers is increased to compensate for using only the subset (e.g., +6 dB).

(A12) In some implementations of A9-A11, where reconfiguring the plurality of speakers includes utilizing only the subset of the plurality of speakers for subsequent audio output having an audio frequency above a threshold frequency. In some implementations, the threshold frequency is 160 Hz. In some implementations, all woofers are used for bass frequencies while less than all woofers are used for higher frequencies. In some implementations, the subset is selected based on a location of the user, distance from resting surface, and/or capabilities of individual speakers.

(A13) In some implementations of A9-A12, where reconfiguring the plurality of speakers includes: (1) utilizing only the subset of the plurality of speakers for subsequent audio output while a volume setting of the audio device is below a volume threshold; and (2) utilizing the subset and one or more additional speakers of the plurality of speakers for subsequent audio output while the volume setting of the audio device is above the volume threshold. In some implementations, an input/output matrix is used to time slewing audio output across the transition.

(A14) In some implementations of A9-A13, further comprising audio-pairing the audio device with an additional audio device; and where configuring the operation of the plurality of speakers comprising utilizing a first subset of the plurality of speakers while in the first orientation and utilizing a second subset of the plurality of speakers while in the second orientation (e.g., utilizing a subset of speakers furthest from the additional audio device (to enhance surround sound output of the devices) while in a horizontal orientation and utilizing a different subset (e.g., topmost speakers) while in a vertical orientation). In some implementations, the audio device is audio-paired with a plurality of additional audio devices and each device operates in a mono mode such that a surround sound effect is achieved by the audio devices as a group. In some implementations, all of the speakers are used in one of the orientations (e.g., all speakers used in vertical orientation). In some implementations, timing of audio output at each device is adjusted based on relative positioning between devices (e.g., to enhance synchronization of outputs).

(A15) In some implementations of A1-A14, where the plurality of device interface elements includes a plurality of lighting elements; and where configuring the operation of two or more of the plurality of device interface elements includes adjusting operation of the plurality of lighting elements. In some implementations, the plurality of lighting elements comprises a plurality of light emitting diodes (LEDs). In some implementations, adjusting the operation of the lighting elements includes disabling a first subset of the lighting elements and enabling a second subset. In some implementations, the plurality of lighting elements comprises a first line of lighting elements along a first axis and a second line of lighting elements along a second axis, distinct from the first. In some implementations, adjusting the operation of the lighting elements comprises utilizing the first line of lighting elements to transmit device state information while in the first orientation and utilizing the second line of lighting elements to transmit the device state information while in the second orientation. In some implementations, adjusting the operation of the lighting elements comprises utilizing only a subset of the lighting elements that are substantially horizontal to the ground.

(A16) In some implementations of A1-A15, where the audio device further comprises a detachable mount; and where the detachable mount is configured to couple to two or more sides of the audio device to facilitate positioning the audio device in multiple orientations. In some implementations, the detachable mount is configured to magnetically coupled to respective magnets within a housing the audio device. In some implementations, the detachable mount is composed of silicone. In some implementations, the mount is configured to only couple at locations that correspond to valid orientations of the device.

(A17) In some implementations of A1-A16, where the audio device further includes a power port; and where the audio device is configured such that the power port is in proximity to a resting surface for the audio device in both the first orientation and the second orientation, e.g., the power port is in a corner section of the audio device between the two sides used for resting the audio device in the two orientations.

(A18) In some implementations of A1-A17, where the audio device further includes one or more antennas; and where audio device is configured such that the antennas maintain at least a threshold distance from a resting surface for the audio device in both the first orientation and the second orientation (e.g., the antenna(s) are arranged opposite the two sides used for resting the audio device in the two orientations).

(A19) In some implementations of A1-A18, further comprising: detecting a change in orientation of the audio device from the first orientation to a third orientation; and, in response to detecting the change in orientation to the third orientation, presenting an error state to the user. For example, outputting the message "the device is upside down" via the one or more speakers, displaying an error state via one or more LEDs of the device, and/or sending an error alert to a client device of the user.

In another aspect, some implementations include an audio device including one or more processors and memory coupled to the one or more processors, the memory storing one or more programs configured to be executed by the one or more processors, the one or more programs including instructions for performing any of the methods described herein (e.g., A1-A19 above).

In yet another aspect, some implementations include a non-transitory computer-readable storage medium storing one or more programs for execution by one or more processors of an audio device, the one or more programs including instructions for performing any of the methods described herein (e.g., A1-A19 above).

Thus, devices, storage mediums, and computing systems are provided with methods for automatically adjusting operation of a device interface in accordance with orientation changes, thereby increasing the effectiveness, efficiency, and user satisfaction with such systems. Such methods may complement or replace conventional methods for audio equalization.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 6A-6B are interior views showing a representative electronic device in different orientations in accordance with some implementations.

FIGS. 9A-9D are perspective views showing a representative electronic device in different orientations in accordance with some implementations.

FIGS. 10A-10B are perspective views showing a representative electronic device in different orientations in accordance with some implementations.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

The present disclosure describes electronic devices, such as audio device with multiple speakers, that change operation based on orientation. For example, an audio device that switches between stereo output mode and mono output mode based on orientation. A representative electronic device (e.g., the device 100) includes multiple device interface elements, such as volume controls (e.g., volume control 702), LEDs (e.g., LED component 602), and microphones (e.g., the microphones 106). In accordance with some implementations, the electronic device determines its orientation and adjusts operation of the volume control (reversing directionality), the LEDs (activating different subsets of the LEDs), and/or the microphones (assigning different tasks to subsets of the microphones) based on the determined orientation.

Figure 1B:
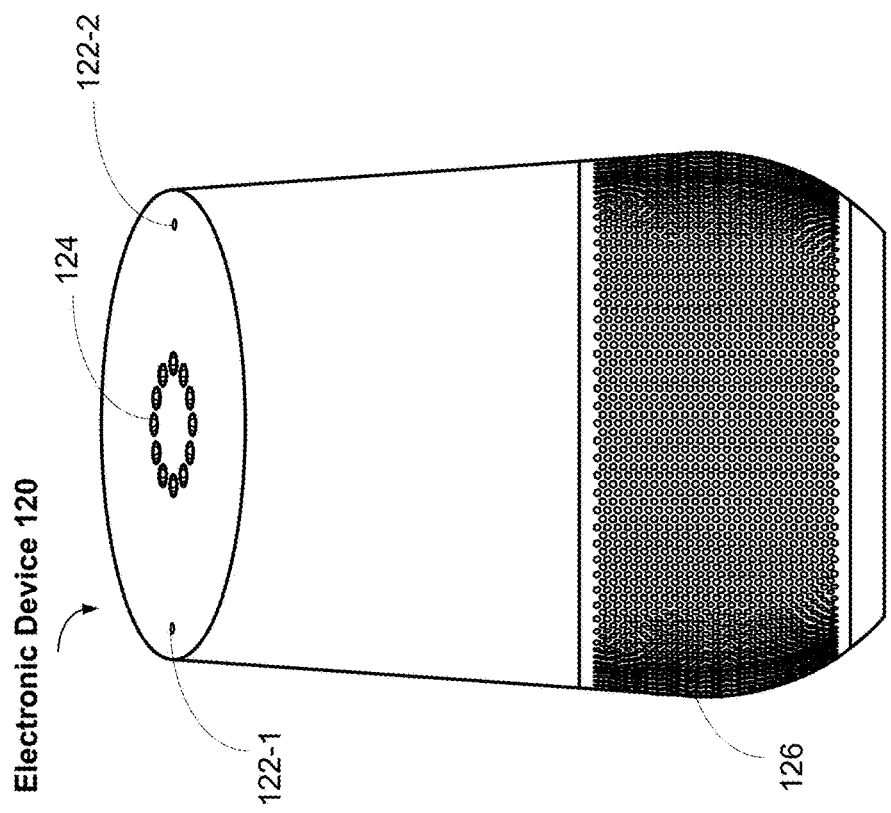
FIGS. 1A and 1B illustrate representative electronic devices in accordance with some implementations.
Figure 1A:
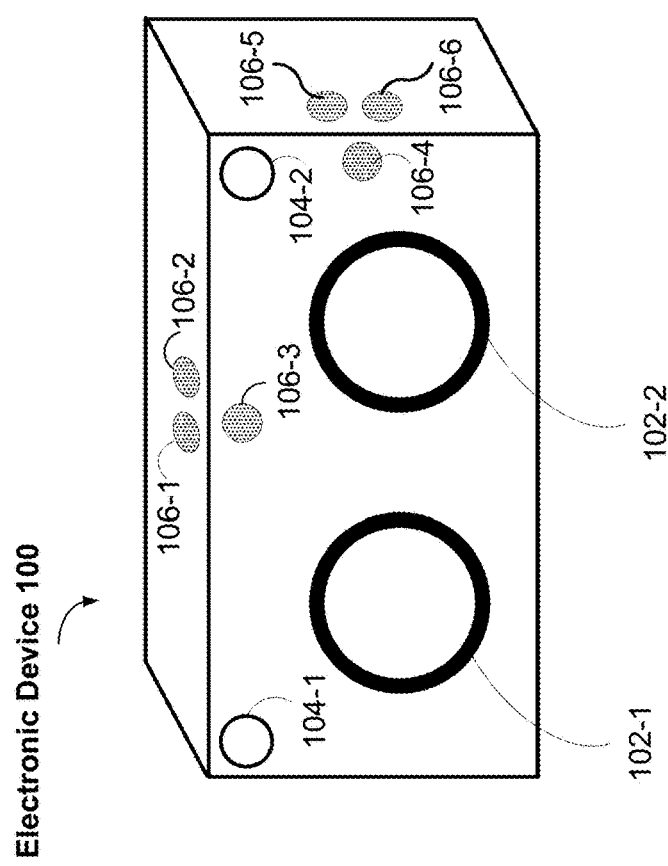

FIG. 1A illustrates an electronic device 100 in accordance with some implementations. The electronic device 100 includes one or more bass speakers 102 (e.g., 102-1 and 102-2), one or more tweeter speakers 104, and multiple microphones 106. In some implementations, speakers 102 include different types of speakers, e.g., low-frequency bass speakers and high-frequency treble/tweeter speakers. In some implementations, the speakers 102 are used for frequencies below a frequency threshold and the speakers 104 are used for frequencies above the frequency threshold. In some implementations, the frequency threshold is around 1900 Hz (e.g., 1850 Hz, 1900 Hz, or 1950 Hz). In some implementations, the electronic device 100 includes three or more speakers 102. In some implementations, the speakers 102 are arranged at different geometries (e.g., in a triangular configuration). In some implementations, the electronic device 100 does not include any tweeter speakers 104. In some implementations, the electronic device 100 includes fewer than six microphones 106. In some implementations, the electronic device 100 includes more than six microphones 106. In some implementations, the microphones 106 include two or more different types of microphones.

In FIG. 1A, the microphones 106 are arranged in groupings of three, where one of the microphones (e.g., the microphone 106-3) is on a front face of the electronic device 100 and the other two microphones (e.g., the microphones 106-1 and 106-2) in the grouping are on a side or top of the device. In some implementations, the microphones 106 are arranged at locations within the electronic device 100 other than the locations shown in FIG. 1A. In some implementations, the microphones 106 are grouped differently on the electronic device 100. For example, the microphones 106 are arranged in groupings of four with one microphone on a front face and one microphone on a back face of the device 100. In some implementations, the microphones 106 are oriented and/or positioned relative to the speakers 102. For example, one microphone (e.g., 106-3) faces the same direction as the speakers 102 and the other microphones (e.g., 106-1 and 106-2) are perpendicular (or generally perpendicular) to the direction of the speakers 102. As another example, one microphone (e.g., 106-3) is positioned closer to the speakers 102 than the other microphones (e.g., 106-1 and 106-2). Therefore, in some implementations, the microphones 106 are positioned such that phase differences are present in received audio and can be analyzed to determine room characteristics. In some implementations, the speakers (e.g., the speakers 102 and/or 104) are aligned on a same plane (e.g., both face outward form a front face of the device). In some implementations, the speakers face in different directions (e.g., the speaker 102-1 is angled to the left and the speaker 102-2 is angled to the right).

FIG. 1B illustrates an electronic device 120 in accordance with some implementations. In some implementations, the electronic device 120 includes microphones 122, an array of illuminators 124 (e.g., LEDs), and one or more speakers that are located behind the mesh 126. Further, the rear side of the electronic device 120 optionally includes a power supply connector configured to couple to a power supply (not shown). In some implementations, the electronic device 120 includes more or less microphones 122 than shown in FIG. 1B. In some implementations, the microphones 122 are arranged at locations within the electronic device 120 other than the locations shown in FIG. 1B.

In some implementations, the electronic device 100 and/or the electronic device 120 are voice-activated. In some implementations, the electronic device 100 and/or the electronic device 120 present a clean look having no visible button, and the interaction with the electronic device 120 is based on voice and touch gestures. Alternatively, in some implementations, the electronic device 100 and/or the electronic device 120 include a limited number of physical buttons (not shown), and the interaction with the electronic device is further based on presses of the button in addition to the voice and/or touch gestures.

Figure 2:
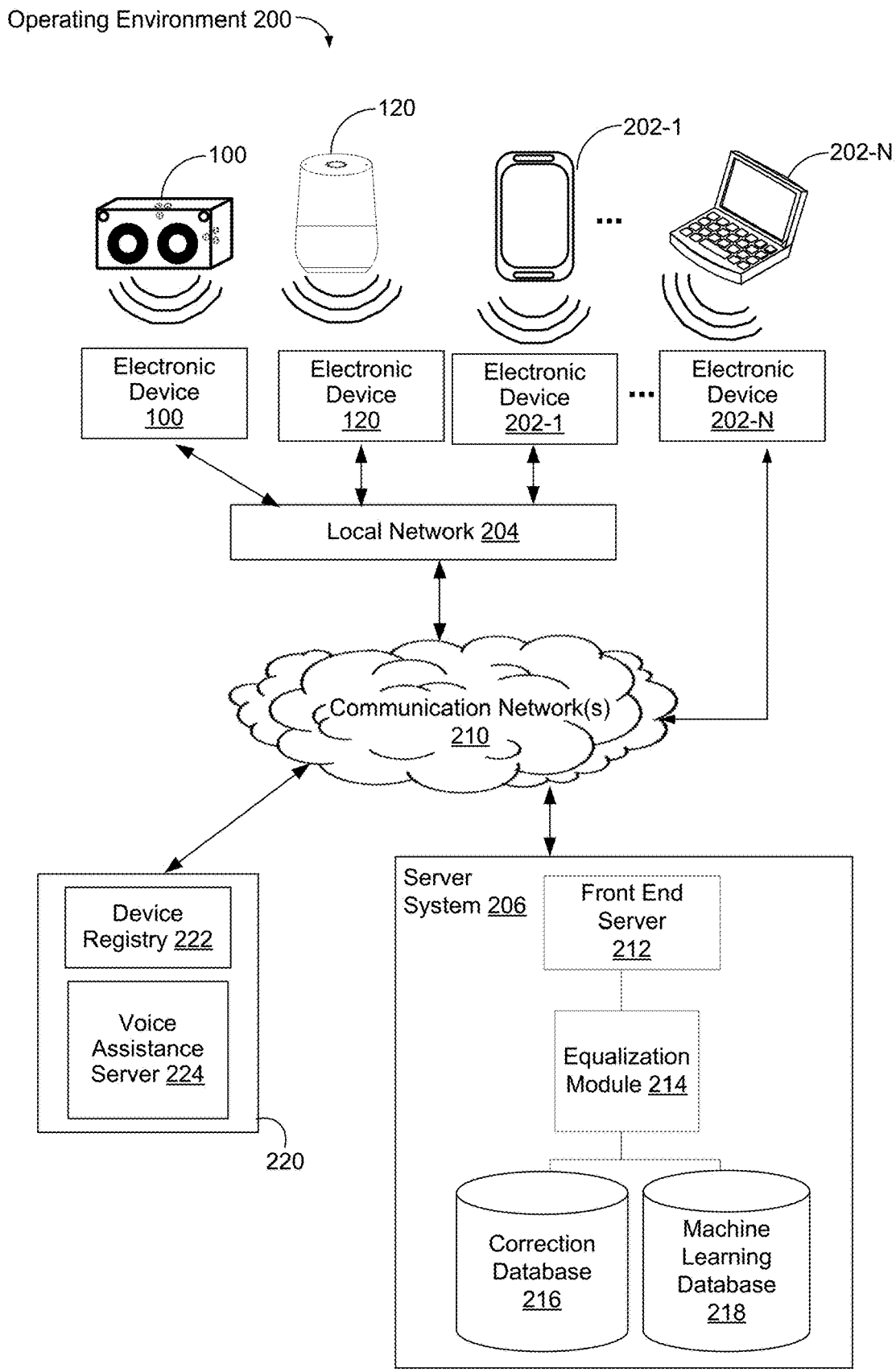
FIG. 2 is a block diagram illustrating a representative operating environment that includes a plurality of electronic devices and a server system in accordance with some implementations.

FIG. 2 is a block diagram illustrating a operating environment 200 that includes a plurality of electronic devices 100, 120, and 202, and server systems 206, 220 in accordance with some implementations. The operating environment includes one or more electronic devices 100, 120, and 202 which are located at one or more positions within a defined space, e.g., in a single room or space of a structure, or within a defined area of an open space.

Examples of an electronic device 202 include the electronic device 100, the electronic device 120, a handheld computer, a wearable computing device, a personal digital assistant (PDA), a tablet computer, a laptop computer, a desktop computer, a cellular telephone, a smart phone, a voice-activated device, an enhanced general packet radio service (EGPRS) mobile phone, a media player, or a combination of any two or more of these data processing devices or other data processing devices.

In accordance with some implementations, the electronic devices 100, 120, and 202 are communicatively coupled through communication network(s) 210 to a server system 206 and a smart assistant system 220. In some implementations, at least some of the electronic devices (e.g., devices 100, 120, and 202-1) are communicatively coupled to a local network 204, which is communicatively coupled to the communication network(s) 210. In some implementations, the local network 204 is a local area network implemented at a network interface (e.g., a router). In some implementations, the electronic devices 100, 120, and 202 that are communicatively coupled to the local network 204 also communicate with one another through the local network 204. In some implementations, the electronic devices 100, 120, and 202 are communicatively coupled to one another (e.g., without going through the local network 204 or the communication network(s) 210).

Optionally, one or more of the electronic devices are communicatively coupled to the communication networks 210 and are not on the local network 204 (e.g., electronic device 202-N). For example, these electronic devices are not on the Wi-Fi network corresponding to the local network 204 but are connected to the communication networks 210 through a cellular connection. In some implementations, communication between electronic devices 100, 120, and 202 that are on the local network 204 and electronic devices 100, 120, and 202 that are not on the local network 204 is performed through the voice assistance server 224. In some implementations, the electronic devices 202 are registered in a device registry 222 and thus known to the voice assistance server 224.

In some implementations, the server system 206 includes a front end server 212 that facilitates communication between the server system 206 and electronic devices 100, 120, and 202 via the communication network(s) 210. For example, the front end server 212 receives audio content (e.g., the audio content is music and/or speech) from the electronic devices 202. In some implementations, the front end server 212 is configured to send information to the electronic devices 202. In some implementations, the front end server 212 is configured to send equalization information (e.g., frequency corrections). For example, the front end server 212 sends equalization information to the electronic devices in response to received audio content. In some implementations, the front end server 212 is configured to send data and/or hyperlinks to the electronic devices 100, 120, and/or 202. For example, the front end server 212 is configured to send updates (e.g., database updates) to the electronic devices.

In some implementations, the server system 206 includes an equalization module 214 that determines from the audio signals collected from the electronic devices 202 information about the audio signals, such as frequencies, phase differences, transfer functions, feature vectors, frequency responses etc. In some implementations, the equalization module 214 obtains frequency correction data from the correction database 216 to be sent to the electronic device (e.g., via the front end server 212). In some implementations, the frequency correction data is based on information about the audio signals. In some implementations, the equalization module 214 applies machine learning (e.g., in conjunction with a machine learning database 218) to the audio signals to generate a frequency correction.

In some implementations, the server system 206 includes a correction database 216 that stores frequency correction information. For example, the correction database 216 includes pairings of audio feature vectors and corresponding frequency corrections.

In some implementations, the server system 206 includes a machine learning database 218 that stores machine learning information. In some implementations, the machine learning database 218 is a distributed database. In some implementations, the machine learning database 218 includes a deep neural network database. In some implementations, the machine learning database 218 includes supervised training and/or reinforcement training databases.

Figure 3:
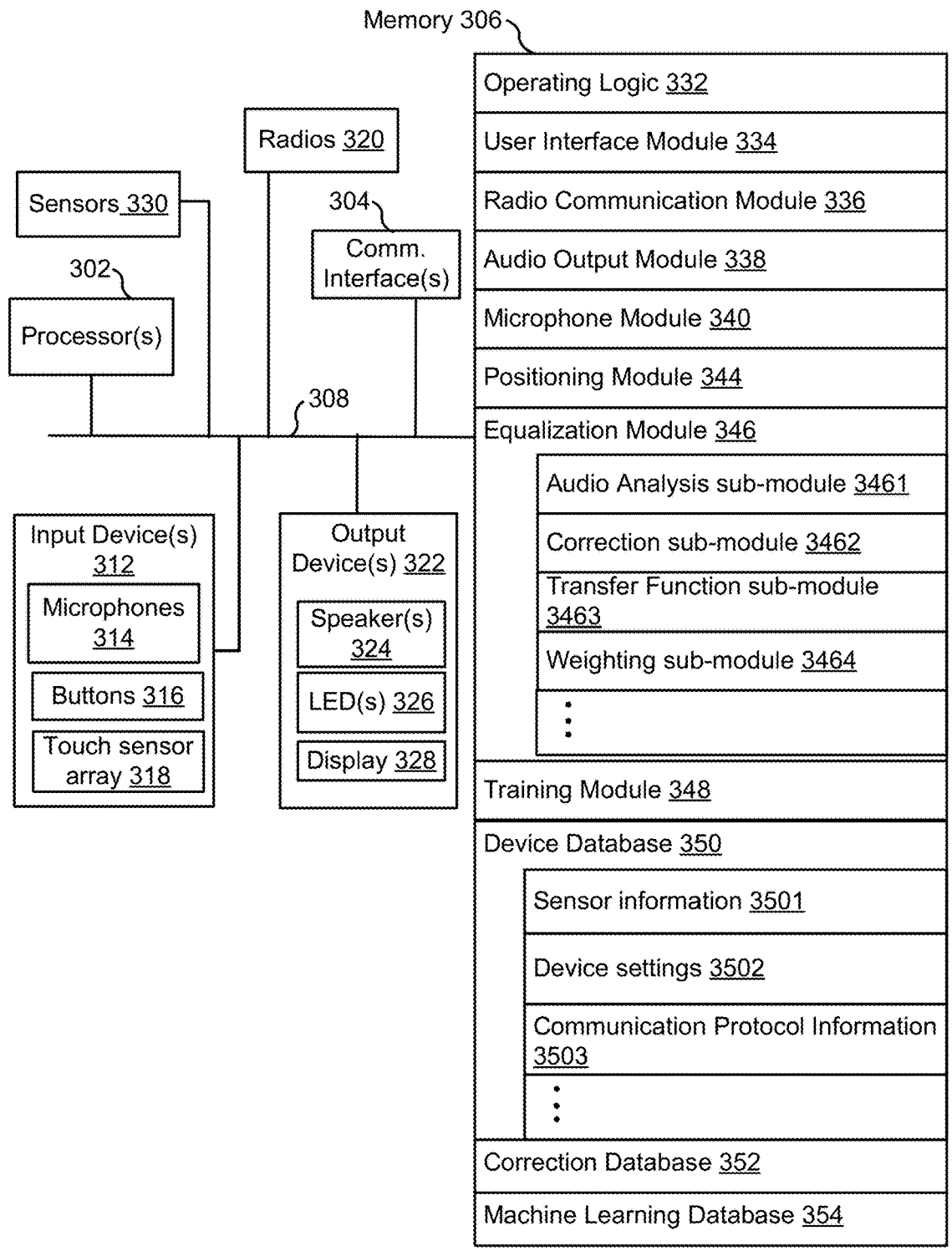
FIG. 3 is a block diagram illustrating a representative electronic device in accordance with some implementations.

FIG. 3 is a block diagram illustrating an electronic device 300 in accordance with some implementations. In some implementations, the electronic device 300 is, or includes, any of the electronic devices 100, 120, 202 of FIG. 2. The electronic device 300 includes one or more processor(s) 302, one or more network interface(s) 304, memory 306, and one or more communication buses 308 for interconnecting these components (sometimes called a chipset).

In some implementations, the electronic device 300 includes one or more input devices 312 that facilitate audio input and/or user input, such as microphones 314, buttons 316, and a touch sensor array 318. In some implementations, the microphones 314 include the microphones 106, the microphones 122, and/or other microphones.

In some implementations, the electronic device 300 includes one or more output devices 322 that facilitate audio output and/or visual output, including one or more speakers 324, LEDs 326 (and/or other types of illuminators), and a display 328. In some implementations, the LEDs 326 include the illuminators 124 and/or other LEDs. In some implementations, the speakers 324 include the bass speakers 102, the tweeter speakers 104, the speakers of device 120, and/or other speakers.

In some implementations, the electronic device 300 includes radios 320 and one or more sensors 330. The radios 320 enable one or more communication networks, and allow the electronic device 300 to communicate with other devices. In some implementations, the radios 320 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) custom or standard wired protocols (e.g., Ethernet, HomePlug, etc.), and/or any other suitable communication protocol, including communication protocols not yet developed as of the filing date of this document.

In some implementations, the sensors 330 include one or more movement sensors (e.g., accelerometers), light sensors, positioning sensors (e.g., GPS), and/or audio sensors. In some implementations, the positioning sensors include one or more location sensors (e.g., passive infrared (PIR) sensors) and/or one or more orientation sensors (e.g., gyroscopes).

The memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, optionally, includes one or more storage devices remotely located from one or more processor(s) 302. The memory 306, or alternatively the non-volatile memory within the memory 306, includes a non-transitory computer-readable storage medium. In some implementations, the memory 306, or the non-transitory computer-readable storage medium of the memory 306, stores the following programs, modules, and data structures, or a subset or superset thereof:

- operating logic 332 including procedures for handling various basic system services and for performing hardware dependent tasks;
- a user interface module 334 for providing and displaying a user interface in which settings, captured data including hotwords, and/or other data for one or more devices (e.g., the electronic device 300 and/or other devices) can be configured and/or viewed;
- a radio communication module 336 for connecting to and communicating with other network devices (e.g., local network 204, such as a router that provides Internet connectivity, networked storage devices, network routing devices, server system 206, smart home server system 220 etc.) coupled to one or more communication networks 210 via one or more communication interfaces 304 (wired or wireless);
- an audio output module 338 for determining and/or presenting audio signals (e.g., in conjunction with the speakers 324), such as adjusting operational settings of the speakers;
- a microphone module 340 for obtaining and/or analyzing audio signals (e.g., in conjunction with the microphones 314);
- a positioning module 344 for obtaining and/or analyzing positioning information (e.g., orientation and/or location information), e.g., in conjunction with the sensors 330;
- an equalization module 346 for equalizing audio output of the electronic device 300, including, and not limited to:
  - an audio analysis sub-module 3461 for analyzing audio signals collected from input devices (e.g., microphones), for example, determining audio properties (e.g., frequencies, phase shifts and/or phase differences) and/or generating fast Fourier transforms (FFTs) of audio frequencies;
  - a correction sub-module 3462 for obtaining frequency corrections from a correction database 352 and/or applying the frequency corrections to the electronic device 300;
  - a transfer function sub-module 3463 for determining feature vectors, acoustic transfer functions (relating the audio outputs to the audio inputs), and/or frequency responses of the electronic device 300 using the analyzed audio signals; and
  - a weighting sub-module 3464 for assigning different weights to respective audio signals and/or audio properties (e.g., phase differences and/or signal-to-noise ratios);
- a training module 348 for generating and/or training audio models and, optionally, fingerprinting audio events associated with the electronic device 300;
- a device database 350, for storing information associated with the electronic device 300, including, and not limited to:
  - sensor information 3501 associated with the sensors 330;
  - device settings 3502 for the electronic device 300, such as default options and preferred user settings; and
  - communications protocol information 3503 specifying communication protocols to be used by the electronic device 300;
- a correction database 352 for storing frequency correction information; and
- a machine learning database 354 for storing machine learning information.

In some implementations, the correction database 352 includes the following datasets or a subset or superset thereof:

- position data corresponding to different locations and/or orientations of associated audio devices (e.g., the positioning of microphones and/or speakers);
- vector data including phase shifts, phase differences, and/or feature vectors corresponding to different positions and/or orientations of associated audio devices;
- weight information including weights assigned to different signal-to-noise ratios, microphones, pairs of microphones, and/or positioning of microphones;
- training audio including training data (e.g., white noise, pink noise, etc.) for use with constructing the correction database 352; and
- correction data storing information used to correct audio frequency responses of audio devices, including, and not limited to:
  - frequency responses including frequency responses and/or feature vectors corresponding to different locations and/or orientations of audio devices; and
  - frequency corrections corresponding to respective frequency responses.

The machine learning database 354 includes, in accordance with some implementations, the following datasets or a subset or superset thereof:
- neural network data including information corresponding to the operation of one or more neural network(s), including, and not limited to:
  - positioning information including information (e.g., feature vectors) corresponding to different locations and/or orientations of audio devices; and
  - correction data corresponding to the positioning information.

Each of the above identified modules are optionally stored in one or more of the memory devices described herein, and corresponds to a set of instructions for performing the functions described above. The above identified modules or programs need not be implemented as separate software programs, procedures, modules or data structures, and thus various subsets of these modules may be combined or otherwise re-arranged in various implementations. In some implementations, the memory 306 stores a subset of the modules and data structures identified above. Furthermore, the memory 306, optionally, stores additional modules and data structures not described above (e.g., module(s) for hotword detection and/or speech recognition in a voice-enabled smart speaker). In some implementations, a subset of the programs, modules, and/or data stored in the memory 306 are stored on and/or executed by the server system 206 and/or the voice assistance server 224.

Figure 4:
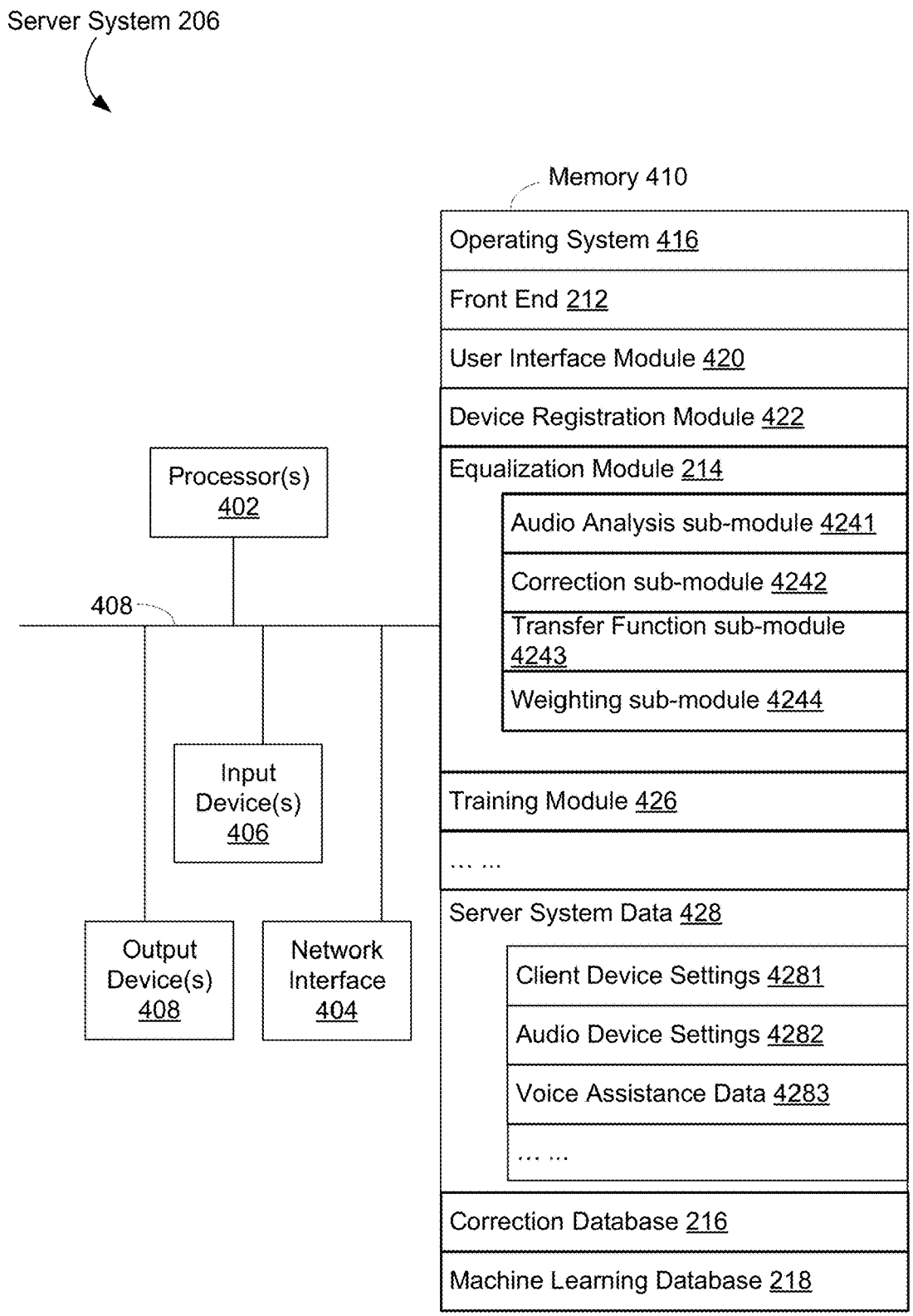
FIG. 4 is a block diagram illustrating a representative server system in accordance with some implementations.

FIG. 4 is a block diagram illustrating the server system 206, in accordance with some implementations. The server system 206 includes one or more processor(s) 402, one or more network interfaces 404, memory 410, and one or more communication buses 408 for interconnecting these components (sometimes called a chipset), in accordance with some implementations.

The server system 206 optionally includes one or more input devices 406 that facilitate user input, such as a keyboard, a mouse, a voice-command input unit or microphone, a touch screen display, a touch-sensitive input pad, a gesture capturing camera, or other input buttons or controls. In some implementations, the server system 206 optionally uses a microphone and voice recognition or a camera and gesture recognition to supplement or replace the keyboard. The server system 206 optionally includes one or more output devices 408 that enable presentation of user interfaces and display content, such as one or more speakers and/or one or more visual displays.

The memory 410 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 410, optionally, includes one or more storage devices remotely located from the one or more processors 402. The memory 410, or alternatively the non-volatile memory within the memory 410, includes a non-transitory computer-readable storage medium. In some implementations, the memory 410, or the non-transitory computer-readable storage medium of the memory 410, stores the following programs, modules, and data structures, or a subset or superset thereof:
- an operating system 416 including procedures for handling various basic system services and for performing hardware dependent tasks;
- a front end 212 for communicatively coupling the server system 206 to other devices (e.g., electronic devices 100, 120, and 202) via the network interface(s) 404 (wired or wireless) and one or more networks, such as the Internet, other wide area networks, local area networks, metropolitan area networks, and so on;
- a user interface module 420 for enabling presentation of information (e.g., a graphical user interface for presenting application(s), widgets, websites and web pages thereof, games, audio and/or video content, text, etc.) either at the server system or at an electronic device;
- a device registration module 422 for registering devices (e.g., electronic device 300) for use with the server system 206;
- an equalization module 424 for equalizing audio output of an electronic device (e.g., electronic device 300), including, and not limited to:
  - an audio analysis sub-module 4241 for analyzing audio signals received from electronic device(s) (e.g., electronic device 300), for example, determining audio properties (e.g., frequencies, phase shifts and/or phase differences) and/or generating fast Fourier transforms (FFTs) of audio frequencies;
  - a correction sub-module 4242 for obtaining frequency corrections from a correction database 216 and/or applying the frequency corrections to an electronic device 300;
  - a transfer function sub-module 4243 for determining feature vectors, acoustic transfer functions (relating the audio outputs to the audio inputs), and/or frequency responses of an electronic device 300 using the analyzed audio signals; and
  - a weighting sub-module 4244 for assigning different weights to respective audio signals and/or audio properties (e.g., phase differences and/or signal-to-noise ratios);
- a training module 426 for generating and/or training audio models and, optionally, fingerprinting audio events associated with electronic device(s) 300;
- server system data 428 storing data associated with the server system 206, including, but not limited to:
  - client device settings 4281 including device settings for one or more electronic devices (e.g., electronic device(s) 300), such as common device settings (e.g., service tier, device model, storage capacity, processing capabilities, communication capabilities, etc.), and information for automatic media display control;
  - audio device settings 4282 including audio settings for audio devices associated with the server system 206 (e.g., electronic device(s) 300), such as common and default settings (e.g., volume settings for speakers and/or microphones etc.); and
  - voice assistance data 4283 for voice-activated devices and/or user accounts of the voice assistance server 224, such as account access information and information for one or more electronic devices 300 (e.g., service tier, device model, storage capacity, processing capabilities, communication capabilities, etc.);
- a correction database 216 storing frequency correction information, e.g., the correction database 352 described above; and
- a machine learning database 218 storing machine learning information, e.g., the machine learning database 354 described above.

In some implementations, the server system 206 includes a notification module (not shown) for generating alerts and/or notifications for users of the electronic device(s). For example, in some implementations the correction database is stored locally on the electronic device of the user, the server system 206 may generate notifications to alert the user to download the latest version(s) or update(s) to the correction database.

Each of the above identified elements may be stored in one or more of the memory devices described herein, and corresponds to a set of instructions for performing the functions described above. The above identified modules or programs need not be implemented as separate software programs, procedures, modules or data structures, and thus various subsets of these modules may be combined or otherwise re-arranged in various implementations. In some implementations, the memory 410, optionally, stores a subset of the modules and data structures identified above. Furthermore, the memory 410 optionally stores additional modules and data structures not described above.

Figure 5B:
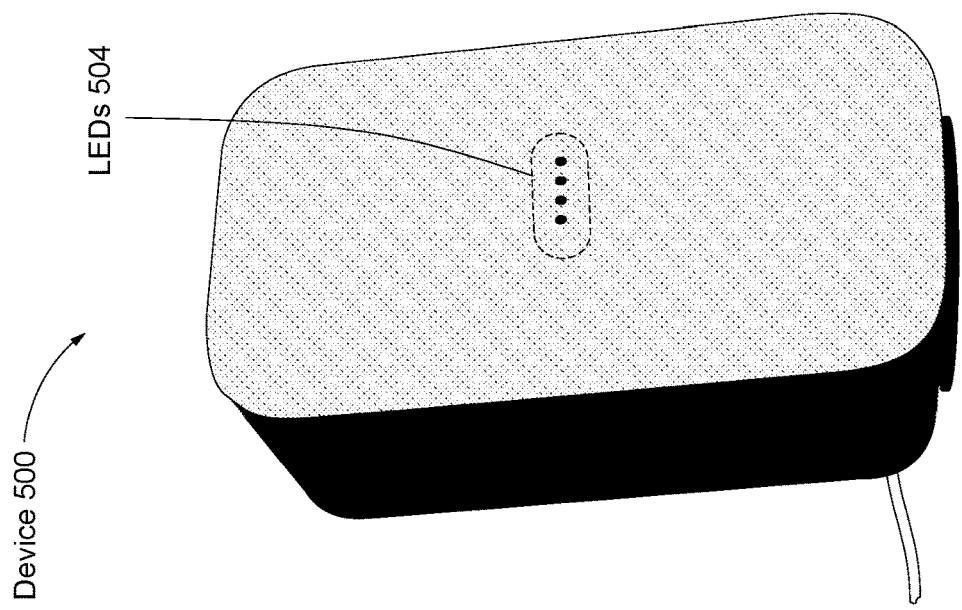
FIGS. 5A-5B are perspective views showing a representative electronic device in different orientations in accordance with some implementations.
Figure 5A:
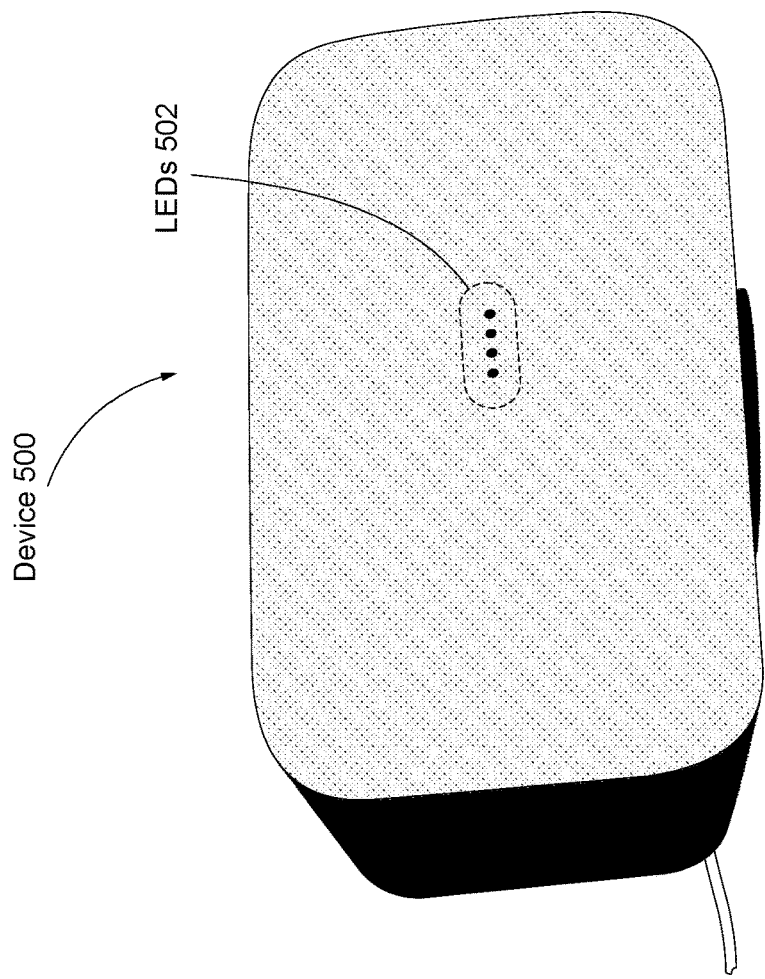

FIGS. 5A-5B are perspective views showing an electronic device 500 in different orientations in accordance with some implementations. FIG. 5A shows the device 500 (e.g., the electronic device 100) in a horizontal orientation with a horizontal display of LEDs 502 (e.g., a first subset of LEDs 326). FIG. 5B shows the device 500 in a vertical orientation with a horizontal display of LEDs 504 (e.g., a second subset of LEDs 326). In accordance with some implementations, the LEDs 502 are arranged perpendicular to the LEDs 504.

FIGS. 6A-6B are interior views showing the electronic device 500 in different orientations in accordance with some implementations. In particular, FIG. 6A shows the device 500 in a horizontal orientation and FIG. 6B shows the device 500 in a vertical orientation. FIGS. 6A-6B also show the device 500 including the speakers 102, the speakers 104, a speaker baffle 604, and an LED component 602 (e.g., including an LED board and the LEDs 502 and 504). In accordance with some implementations, the LED component 602 is positioned so as to minimize occlusion of the speakers 102 (e.g., to minimize degradation of audio output by the speakers).

Figure 7B:
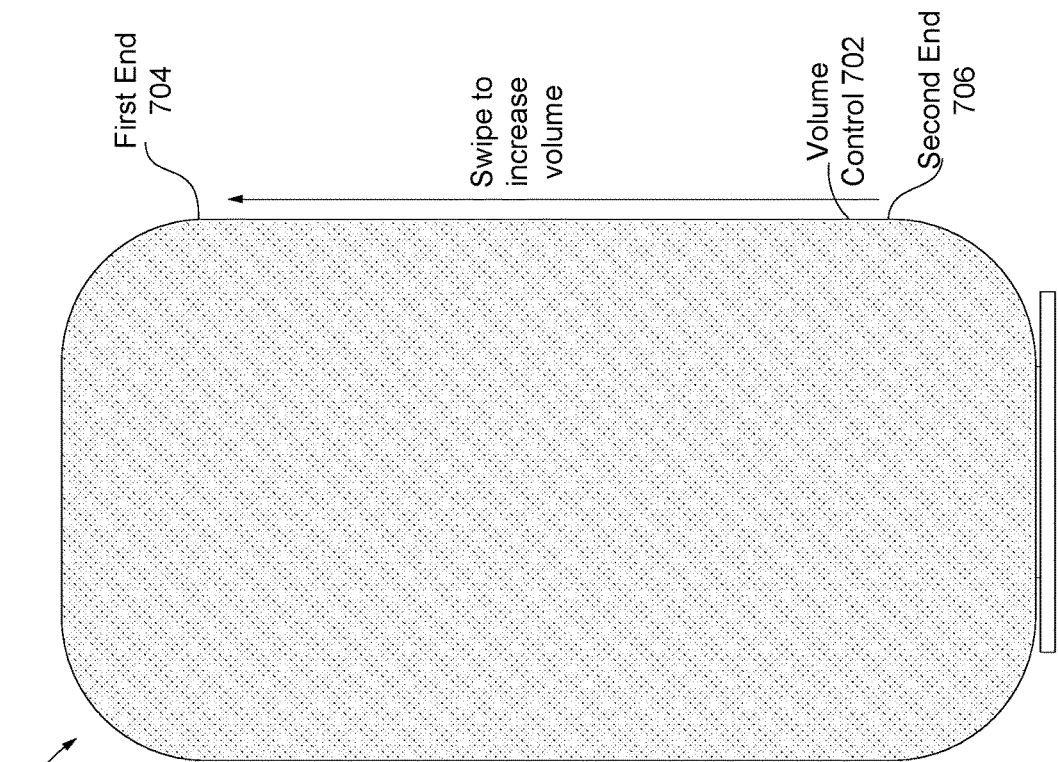
FIGS. 7A-7B illustrate a representative electronic device with a swipe control element (e.g., a volume control) in accordance with some implementations.
Figure 7A:
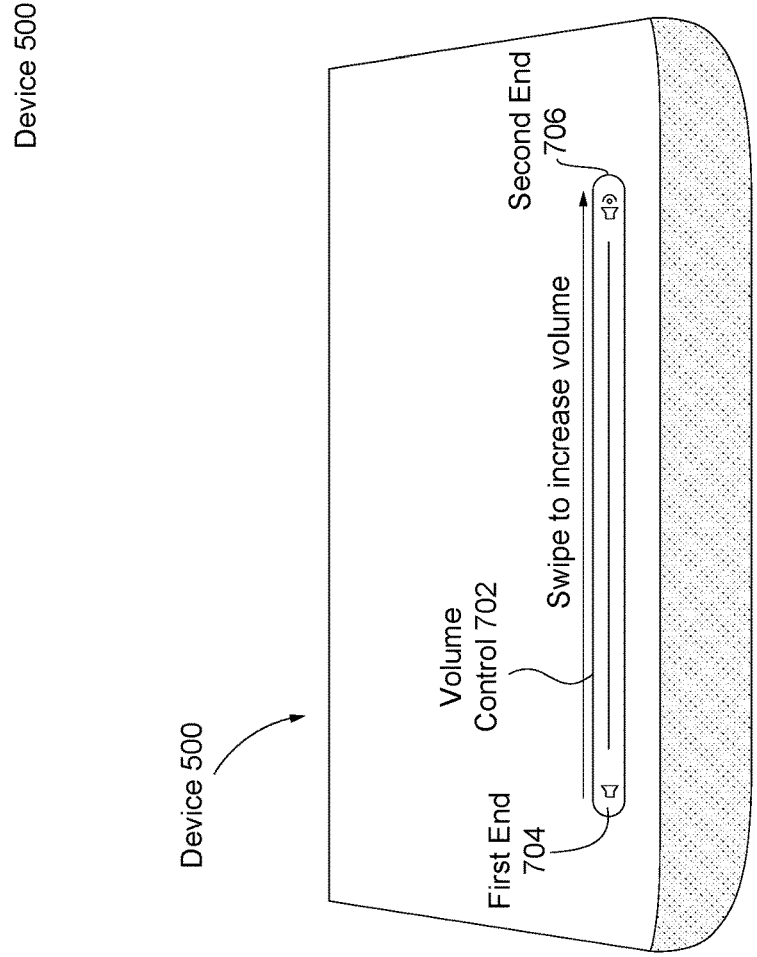

FIGS. 7A-7B illustrate the electronic device 500 with a swipe control element (e.g., a volume control) in accordance with some implementations. FIG. 7A shows the electronic device 500 in a horizontal orientation with a volume control 702. In accordance with some implementations, the volume control 702 is configured such that a swipe input toward a second end 706 of the volume control 702 (e.g., a swipe from left to right) corresponds to a user request to increase volume. FIG. 7B shows the electronic device 500 in a vertical orientation with the volume control 702. In accordance with some implementations, the volume control 702 is configured such that a swipe input toward a first end 704 of the volume control 702 (e.g., an upward swipe) corresponds to a user request to increase volume.

FIGS. 8A-8E are exploded views showing a representative electronic device in accordance with some implementations. As shown in FIGS. 8A-8E, the device 500 includes a housing 804 and a grille 822 configured to couple together and enclose the speaker baffle 604, the speakers 102 and 104, a stiffener 814, a power supply 812, a capacitive touch board 808, a main board 830, antennas 810, magnets 832, and microphones 802. In some implementations, a system-on-chip, controller, and/or processor (e.g., the processor(s) 302) is mounted on the main board 830. In some implementations, the main board 830 includes control circuitry for the power supply 812, the antennas 810, the microphones 802, the speakers 102, and/or the speakers 104. In some implementations, the main board 830 includes an accelerometer for determining an orientation of the device 500.

In accordance with some implementations, the device 500 further includes a mount 806, e.g., configured to magnetically couple to one or more magnets in the housing 804. In some implementations, the mount 806 comprises a silicone pad. In some implementations, the housing 804 includes subsets of the magnets 832 on two sides of the housing 804 for coupling the mount 806 in both a horizontal orientation and a vertical orientation. In some implementations, the magnets 832 are arranged on opposite sides as the microphones 802 (e.g., so that the microphone apertures 822 are not obstructed by a resting surface for the device 500). In some implementations, the magnets 832 include a single magnet on each of two or more sides. In some implementations, the magnets 832 are embedded in the housing 804. In some implementations, portions of the housing 804 are adapted to magnetically couple to the mount 806 (e.g., are composed of magnetic materials).

In some implementations, the microphones 802 are microphones 106. In some implementations, the housing 804 includes microphone apertures 822 and a power port 820. In some implementations, the device 500 includes a plurality of stiffeners, such as the stiffener 814, configured to provide structural support and prevent vibration of the speakers. In some implementations, the antennas 810 include one or more antennas mounted on a circuit board and/or one or more antennas mounted on the housing 804. In some implementations, the antennas 810 are positioned to maximize distance between metal components of the device (e.g., the speakers 102) and the antennas to minimize signal interference.

Figure 9D:
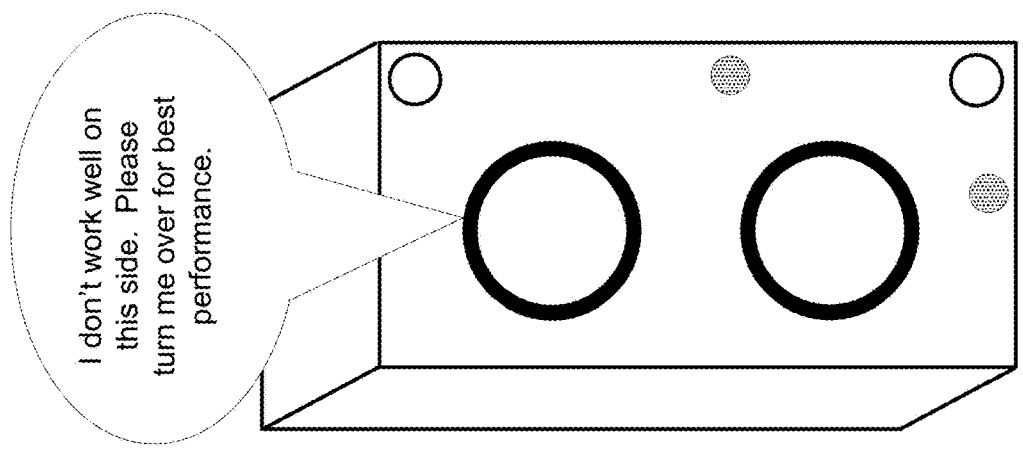

FIGS. 9A-9D are perspective views showing the electronic device 106 in different orientations in accordance with some implementations. FIG. 9A shows the electronic device 106 in a horizontal orientation. In accordance with some implementations, as shown in FIG. 9A, in the horizontal orientation, the left speakers (e.g., speakers 102-1 and 104-1) are assigned to stereo left audio output (also sometimes called left channel) and the right speakers (e.g., speakers 102-2 and 104-2) are assigned to stereo right audio output (also sometimes called right channel). In accordance with some implementations, as shown in FIG. 9A, in the horizontal orientation, microphones on the right (e.g., one or more of the microphones 106-4, 106-5, and 106-6) are assigned to automatic equalization, while microphones on the top (e.g., one or more of the microphones 106-1, 106-2, and 106-3) are assigned to hotword detection.

FIG. 9B shows the electronic device 106 in a vertical orientation. In accordance with some implementations, as shown in FIG. 9B, in the vertical orientation, the upper speakers (e.g., speakers 102-2 and 104-2) are assigned to mono audio output and the lower speakers (e.g., speakers 102-1 and 104-1) are optionally disabled, enabled only for bass frequencies, or enabled only at volume levels above a volume threshold. In accordance with some implementations, as shown in FIG. 9B, in the vertical orientation, microphones on the left (e.g., one or more of the microphones 106-1, 106-2, and 106-3) are assigned to automatic equalization, while microphones on the top (e.g., one or more of the microphones 106-4, 106-5, and 106-6) are assigned to hotword detection. In some implementations, the lower tweeter speaker 104-1 is disabled while in the vertical orientation. In some implementations, the lower tweeter speaker 104-1 is disabled in the vertical orientation while volume levels are below a volume threshold. In some implementations, the lower woofer speaker 102-1 is disabled while in the vertical orientation. In some implementations, the lower woofer speaker 102-1 is disabled for non-bass frequencies (e.g., frequencies above 160 Hertz (Hz)) while in the vertical orientation (e.g., only outputs audio frequencies below 160 Hz). In some implementations, the lower woofer speaker 102-1 is disabled (or disabled for non-bass frequencies) in the vertical orientation while volume levels are below a volume threshold.

Figure 9C:
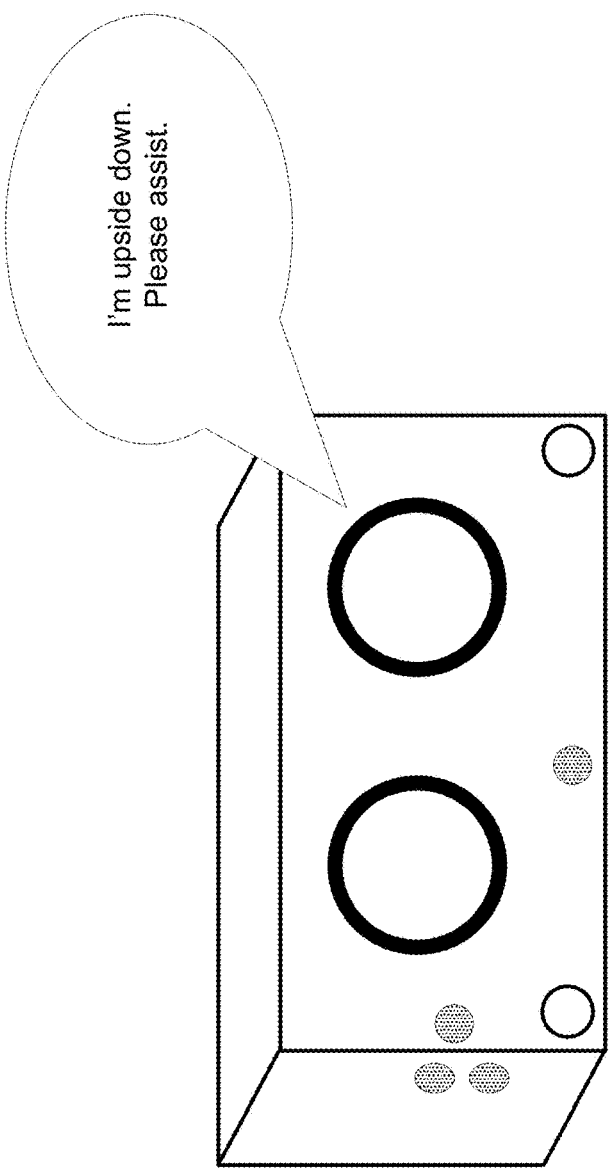

FIGS. 9C and 9D show the electronic device 106 in orientations that result in one or more of the microphones (and optionally one or more of the antennas 810) being in proximity to a resting surface. Close proximity to the resting surface may result in interference for the microphones and antennas. In accordance with some implementations, the electronic device 106 is configured to alert the user to the non-optimal positioning. In some implementations, the device alerts the user to the non-optimal positioning in response to the user activating the device, in response to a wake-up signal, and/or in response to detecting the change in orientation.

Figure 10A:
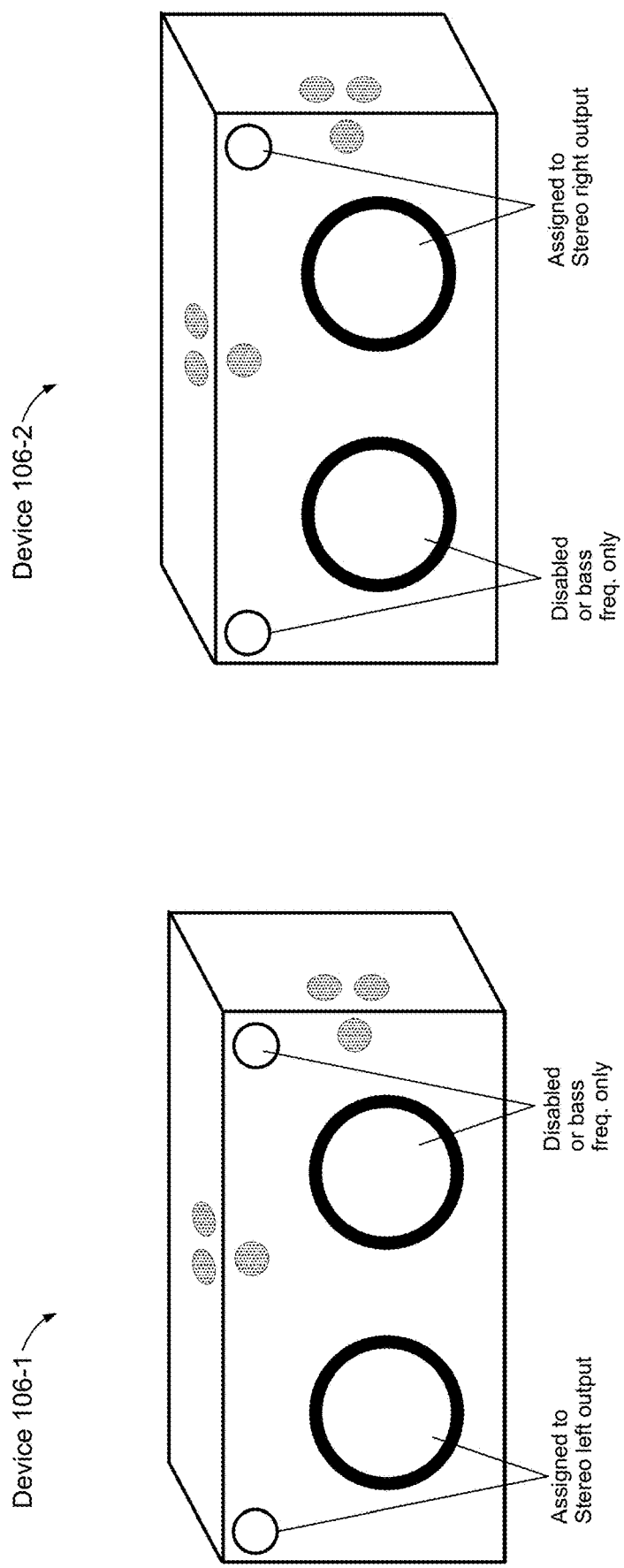

FIGS. 10A-10B are perspective views showing the electronic device 106 in different orientations in accordance with some implementations. FIG. 10A shows devices 106-1 and 106-2 in the horizontal orientation. In accordance with some implementations, the devices 106 are coupled and configured to operate in a surround sound mode. As shown in FIG. 10A, in accordance with some implementations, the device 106-1 is configured to output audio on the left-side speakers (e.g., speakers 102-1 and 104-1) while the right-side speakers (e.g., speakers 102-2 and 104-2) are disabled or outputting only bass frequencies. As shown in FIG. 10A, in accordance with some implementations, the device 106-2 is configured to output audio on the right-side speakers (e.g., speakers 102-2 and 104-2) while the left-side speakers (e.g., speakers 102-1 and 104-1) are disabled or outputting only bass frequencies (e.g., as described above with respect to FIG. 9B). In this way, surround sound effects may be enhanced. In some implementations, each device 106 outputs audio from each of its speakers. In some implementations, the device 106-1 is configured such that the right-side tweeter speaker 104-2 is disabled while the right-side woofer speaker 102-2 is enabled. In some implementations, the device 106-2 is configured such that the left-side tweeter speaker 104-1 is disabled while the left-side woofer speaker 102-1 is enabled. In some implementations, the devices 106 determine their relative positioning and operate the appropriate speakers in accordance with the determination.

FIG. 10B shows devices 106-1 and 106-2 in the vertical orientation. In accordance with some implementations, the devices 106 are coupled and configured to operate in a surround sound mode. As shown in FIG. 10B, in accordance with some implementations, each device 106 is configured to output audio on the upper speakers (e.g., speakers 102-2 and 104-2) while the lower speakers (e.g., speakers 102-1 and 104-1) are disabled or outputting only bass frequencies (e.g., as described above with respect to FIG. 9B). In some implementations, each device 106 outputs audio from each of its speakers. In some implementations, each device 106 is configured such that the upper tweeter speaker 104-1 is disabled while the upper woofer speaker 102-1 is enabled. In some implementations, the devices 106 determine their relative positioning and operate the appropriate speakers in accordance with the determination. In some implementations, the device 106-1 is configured to output audio corresponding to stereo left and the device 106-2 is configured to output audio corresponding to stereo right.

Figure 11:
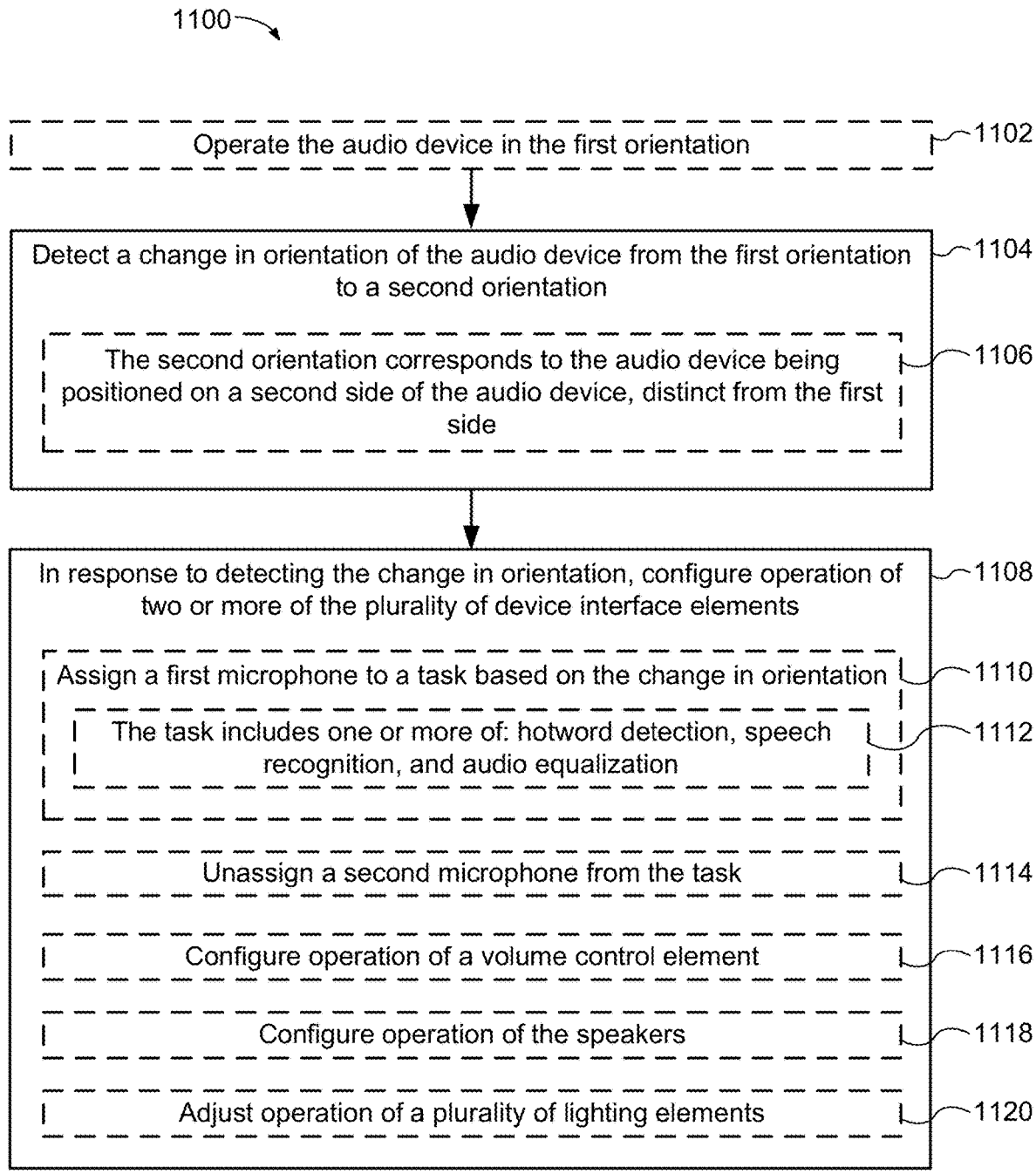
FIG. 11 is a flowchart illustrating a representative method for orientation-based operation of an audio device in accordance with some implementations.

FIG. 11 is a flowchart illustrating a method 1100 for orientation-based operation of an audio device in accordance with some implementations. In some implementations, the method 1100 is performed by an audio device, such as the audio device 100, the audio device 500, or other electronic device 300. In some implementations, the method 1100 is performed by components of an electronic device 300, such as positioning module 344 and audio output module 338 in conjunction with input device(s) 312 and output device(s) 322. In some implementations, the operations of the method 1100 described herein are interchangeable, and respective operations of the method 1100 are performed by any of the aforementioned devices. In some implementations, the method 1100 is governed by instructions that are stored in a non-transitory computer-readable storage medium (e.g., within the memory 306) and that is executed by one or more processors or controllers of a device, such as the processor(s) 302 of the electronic device 300. For convenience, the method 1100 is described below as being performed by an audio device (e.g., the electronic device 500) that includes one or more microphones and a plurality of speakers.

In some implementations, the audio device operates (1102) in a first orientation (e.g., a horizontal orientation). In some implementations, the first orientation corresponds to the audio device being positioned on a first side (e.g., as illustrated in FIG. 5A). In some implementations, operating in the first orientation includes outputting audio content while in the first orientation. In some implementations, operating in the first orientation includes receiving user inputs via one or more device interface elements while in the first orientation.

The audio device detects (1104) a change in orientation of the audio device from the first orientation to a second orientation. In some implementations, the audio device includes an accelerometer and utilizes the accelerometer to detect the change in orientation. In some implementations, the audio device determines its orientation in response to being activated by a user (e.g., powered on or woken up). In some implementations, the audio device periodically checks its orientation and detects the change in orientation by comparing its current orientation to its prior orientation.

In some implementations, the second orientation corresponds to the audio device being positioned on a second side (e.g., resting on the second side), distinct from the first side (e.g., a vertical orientation as illustrated in FIG. 5B). For example, the change in orientation corresponds to a user rotating the device from a horizontal position to a vertical position.

In response to detecting the change in orientation, the audio device configures (1108) operation of two or more of a plurality of device interface elements. In some implementations, the plurality of device interface elements includes one or more of: one or more microphones (e.g., the microphones 106, 314, or 802), one or more speakers (e.g., the speakers 102 and/or 104), one or more lighting elements (e.g., the LEDs 326, 502, and/or 504), one or more swipe controls (e.g., the volume control 702), and the like. In some implementations, configuring operation of two or more of the plurality of device interface elements includes re-configuring one or more of the device interface elements. In some implementations, in addition to configuring operation of the device interface elements, the device performs automatic equalization in accordance with detecting the change in orientation. For example, the device detects a change in orientation and adjusts the speaker settings based on an audio equalization operation as well as updating operation of the device interface elements.

In some implementations, the audio device assigns (1110) a first microphone (e.g., the microphone 106-3) to a task based on the change in orientation. In some implementations, the task includes (1112) one or more of: hotword detection, speech recognition, and audio equalization. In some implementations, the audio device identifies a first microphone as being on a top surface of the audio device while the audio device is in the second orientation and assigns the first microphone the task (e.g., to hotword detection) based on the identification. In some implementations, the audio device identifies a microphone with least interference for assigning the task. In some implementations, the audio device assigns a plurality of microphones (e.g., the microphones 106-1, 106-2, and 106-3) to the task (e.g., a plurality of microphones assigned for automatic equalization). In some implementations, a first subset of the microphones is assigned to a first task (e.g., hotword detection) and a second subset of the microphones is assigned to a second task (e.g., audio equalization).

In some implementations, configuring operation of the two or more device interface elements includes unassigning (1114) a second microphone from the task. For example, in the first orientation a first microphone (e.g., the microphone 106

In some implementations, configuring operation of the two or more device interface elements includes configuring operation (1116) of a volume control element (e.g., the volume control 702). In some implementations, while in the first orientation, movement along the volume control element toward a first end of the volume control element corresponds to increasing volume of the one or more speakers. In some implementations, configuring the operation of the volume control element includes reconfiguring the volume control element so that movement along the volume control element toward the first end of the volume control element corresponds to decreasing the volume of the one or more speakers. In some implementations, the volume control is a capacitive touch element (e.g., a capacitive touch strip). In some implementations, the device includes one or more swipe elements, such as a volume control, a brightness control, and/or a bass amplification.

In some implementations, configuring operation of the two or more device interface elements includes configuring (1118) operation of the speakers (e.g., the speakers 102 and/or the speakers 104). For example, configuring the speakers to adjust treble, bass, and/or amplification of the audio output by the speakers. As an example, while in the first orientation, the plurality of speakers is configured to operate in a stereo mode; and configuring the operation of the plurality of speakers includes reconfiguring the plurality of speakers to operate in a mono mode. In some implementations, audio output is time slewed upon determining an orientation change. In some implementations, audio output is faded to silence briefly prior to reconfiguration of subsequent output. In some implementations, different audio filters (e.g., biquad or ladder filters) are used to reconfigure the subsequent output. In some implementations, treble and bass settings of the speakers is controlled by software executing on the device (e.g., the audio output module 338 executing on the processor(s) 302).

In some implementations, reconfiguring the plurality of speakers to operate in a mono mode includes utilizing only a subset of the plurality of speakers for a subsequent audio output (e.g., to minimize destructive interference between speaker outputs). For example, in a vertical orientation, only the upper speakers are used (e.g., an upper woofer and upper tweeter), as illustrated in FIG. 9B. In some implementations, the subsequent audio output includes TTS output or music. In some implementations, gain of the subset of speakers is increased to compensate for using only the subset (e.g., increased by 4, 5, or 6 dB). In some implementations, one or more of the tweeter speakers is disabled and the remaining tweeter speakers operate with a higher gain to compensate, while the woofer speakers continue to operate in a same manner as prior to the reconfiguration.

In some implementations, reconfiguring the plurality of speakers includes utilizing only the subset of the plurality of speakers for subsequent audio output having an audio frequency above a threshold frequency. In some implementations, the threshold frequency is 140 Hz, 160 Hz, or 200 Hz. In some implementations, all woofers (e.g., speakers 102) are used for bass frequencies while less than all woofers are used for higher frequencies. In some implementations, the subset is selected based on a location of the user, distance from a resting surface, and/or capabilities of individual speakers. For example, if the user is located to the left of the device, the left-most speakers are used, whereas if the user is located to the right of the device, the right-most speakers are used.

In some implementations, reconfiguring the plurality of speakers includes: (1) utilizing only the subset of the plurality of speakers for subsequent audio output while a volume setting of the audio device is below a volume threshold; and (2) utilizing the subset and one or more additional speakers of the plurality of speakers for subsequent audio output while the volume setting of the audio device is above the volume threshold. In some implementations, the volume threshold corresponds to a maximum volume setting of the subset of speakers. In some implementations, the volume threshold is 6 dB, 3 dB, or 1 dB below a maximum volume of the speaker(s). In some implementations, an input/output matrix is used to time-slew audio output across the transition.

In some implementations, the audio device is audio-paired with an additional audio device. In some implementations, configuring the operation of the plurality of speakers includes utilizing a first subset of the plurality of speakers while in the first orientation and utilizing a second subset of the plurality of speakers while in the second orientation. (e.g., utilizing a subset of speakers furthest from the additional audio device while in a horizontal orientation (to enhance surround sound output of the devices) and utilizing a different subset (e.g., upper-most speakers to minimize interference with a resting surface) while in a vertical orientation. In some implementations, the audio device is audio-paired with a plurality of additional audio devices and each device operates in a mono mode such that a surround sound effect is achieved by the audio devices as a group. In some implementations, all of the speakers are used in a same orientation (e.g., all speakers used in vertical orientation). In some implementations, timing of audio output at each device is adjusted based on relative positioning between devices (e.g., to enhance synchronization of outputs).

In some implementations, configuring operation of the two or more device interface elements includes adjusting (1120) operation of a plurality of lighting elements (e.g., the LEDs 502 and 504). In some implementations, operation of the lighting elements is controlled by lighting control circuitry (e.g., mounted on a lighting control board, such as the LED component 602).

In some implementations, the plurality of lighting elements includes a plurality of light emitting diodes (LEDs). In some implementations, adjusting the operation of the lighting elements includes disabling a first subset of the lighting elements and enabling a second subset. In some implementations, the plurality of lighting elements includes a first line of lighting elements (e.g., LEDs 502) along a first axis and a second line of lighting elements (e.g., LEDs 504) along a second axis, distinct from the first. In some implementations, adjusting the operation of the lighting elements includes utilizing the first line of lighting elements to transmit device state information while in the first orientation and utilizing the second line of lighting elements to transmit the device state information while in the second orientation. In some implementations, adjusting the operation of the lighting elements includes utilizing only a subset of the lighting elements that are substantially horizontal to the ground.

In some implementations, the audio device includes a detachable mount (e.g., the mount 806); and the detachable mount is configured to couple to two or more sides of the audio device to facilitate positioning the audio device in multiple orientations. In some implementations, the detachable mount is configured to magnetically coupled to respective magnets within a housing the audio device (e.g., the housing 804). In some implementations, the detachable mount is composed of silicone. In some implementations, the mount is configured to only couple at locations that correspond to valid orientations of the device.

Figure 8A:
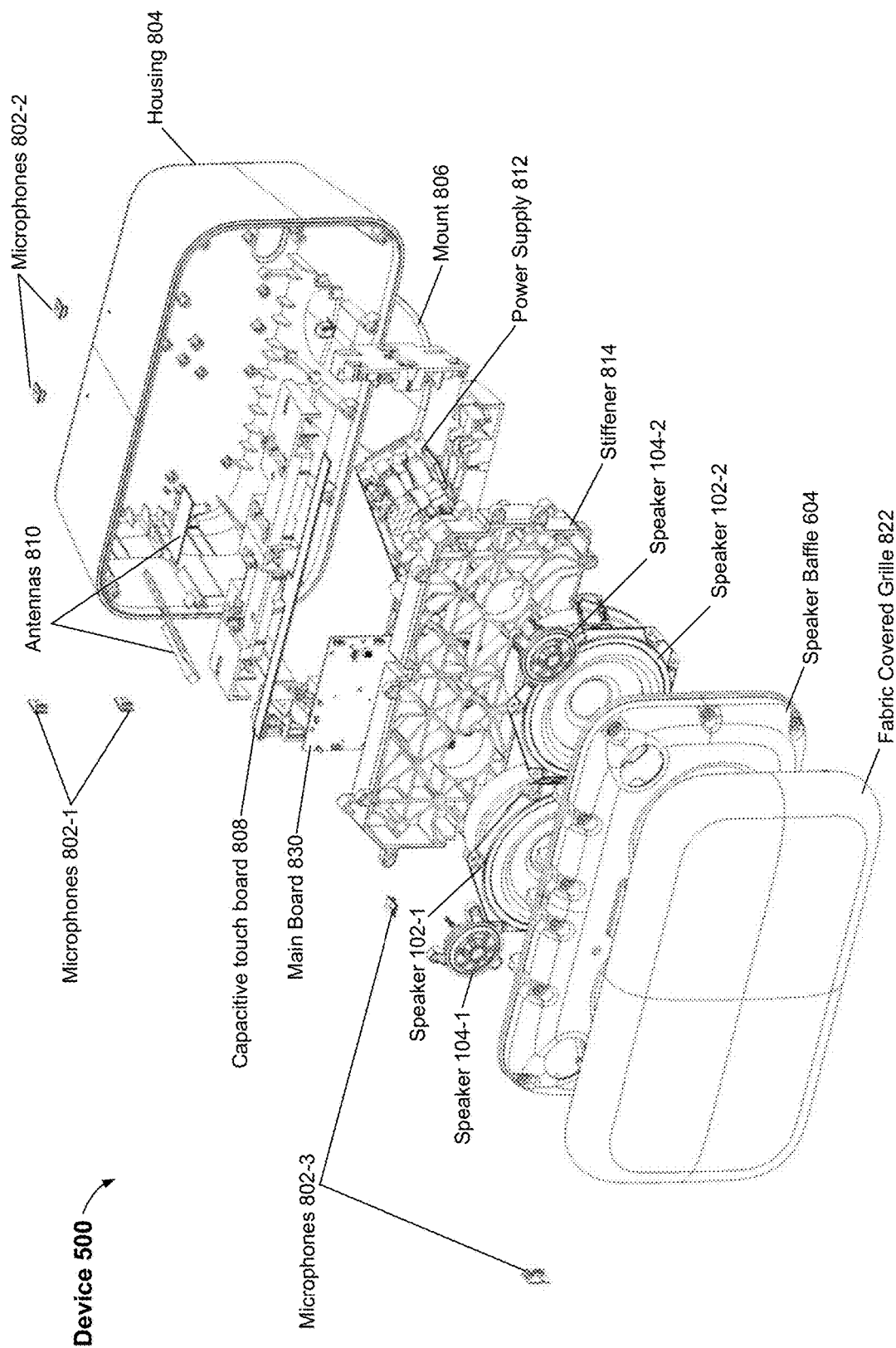
FIGS. 8A-8E are exploded views showing a representative electronic device in accordance with some implementations.
Figure 8B:
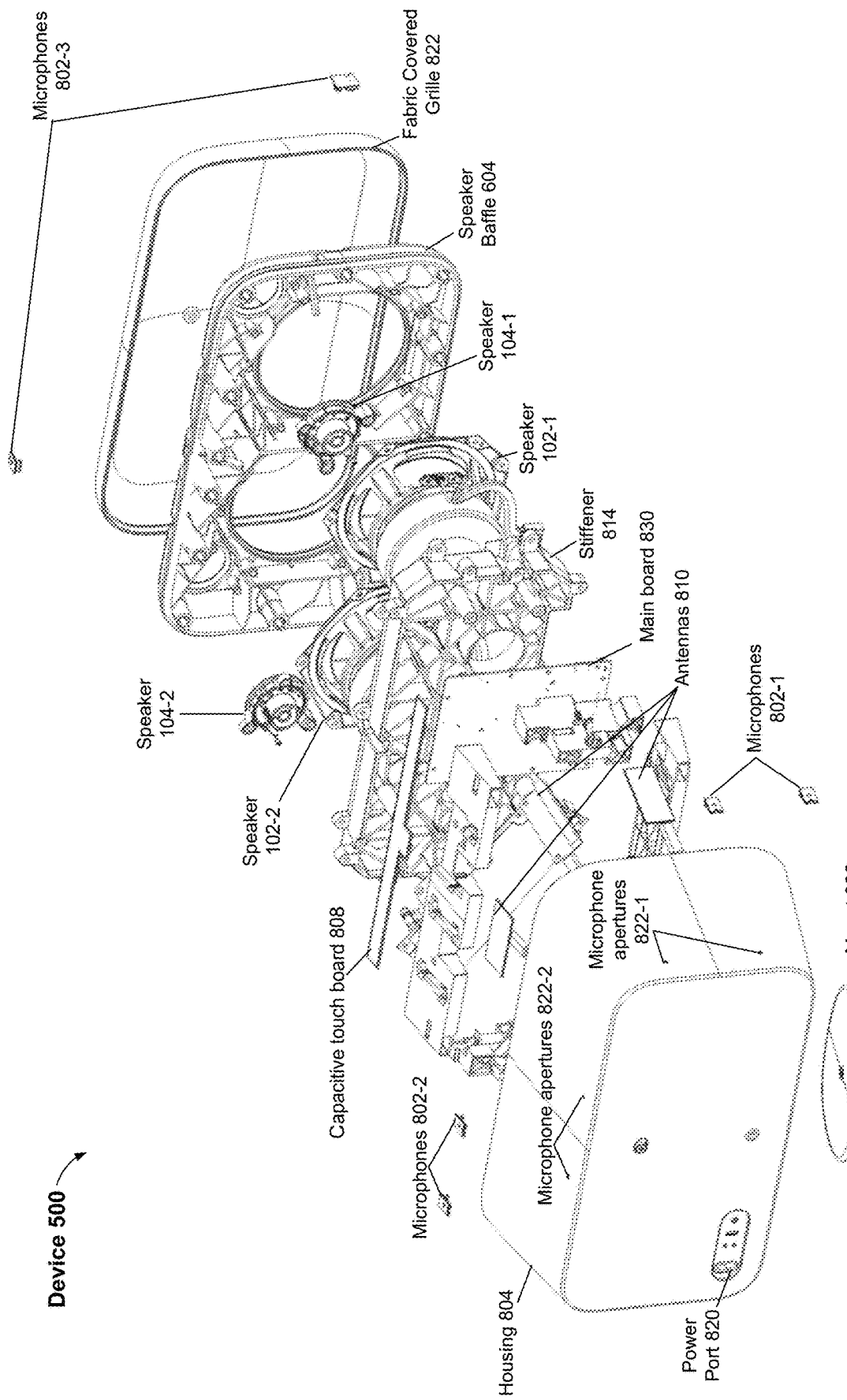
Figure 8C:
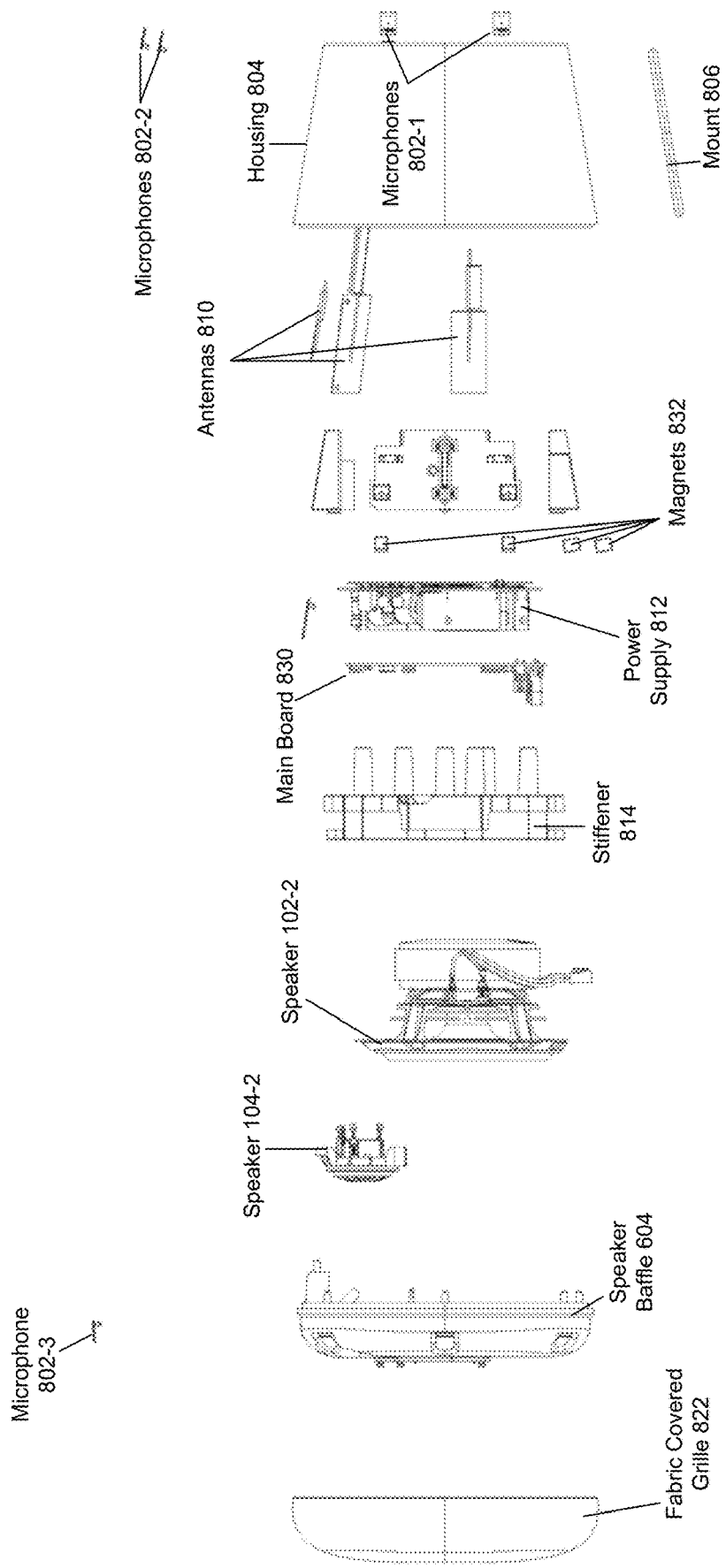
Figure 8D:
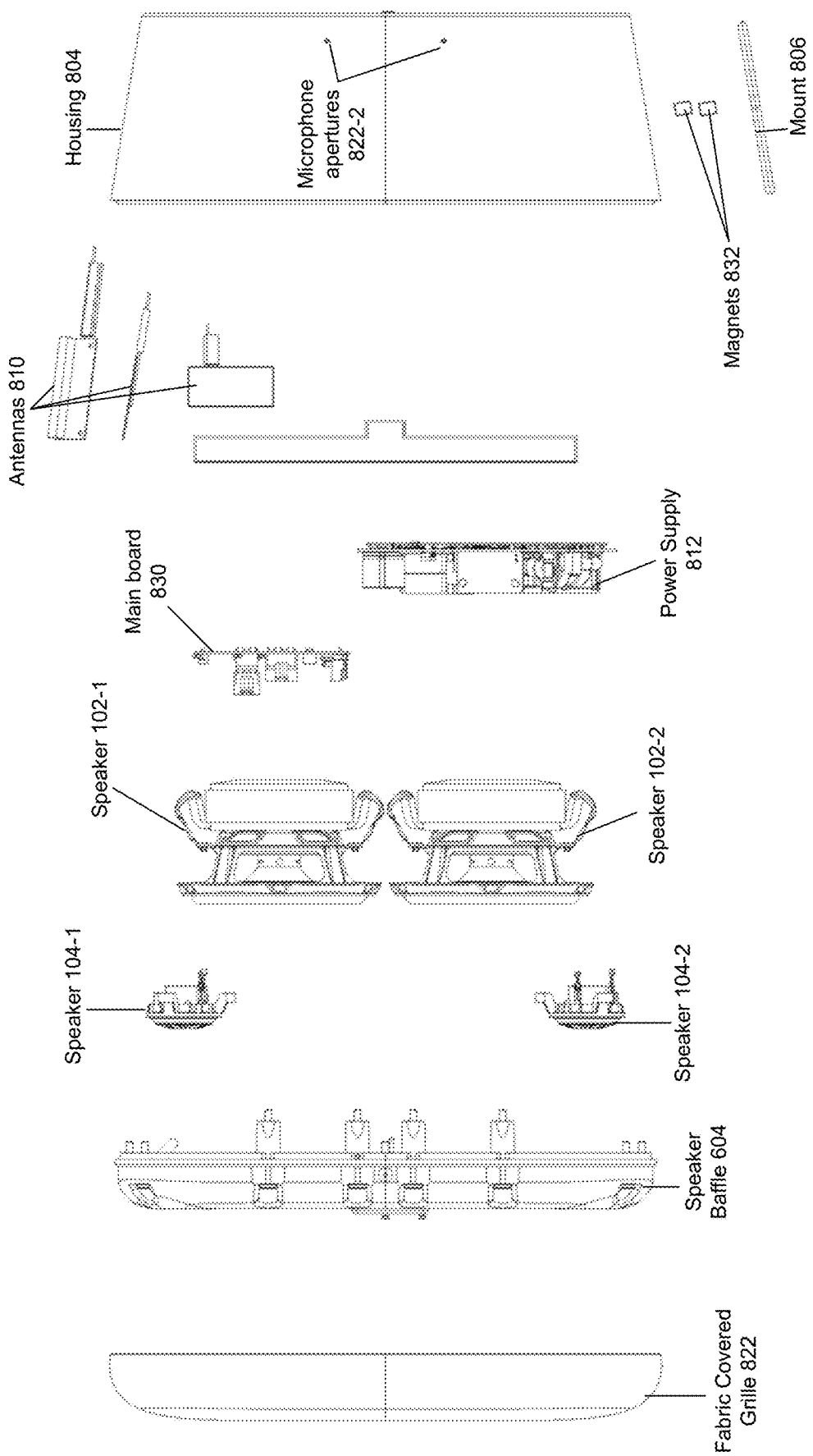
Figure 8E:
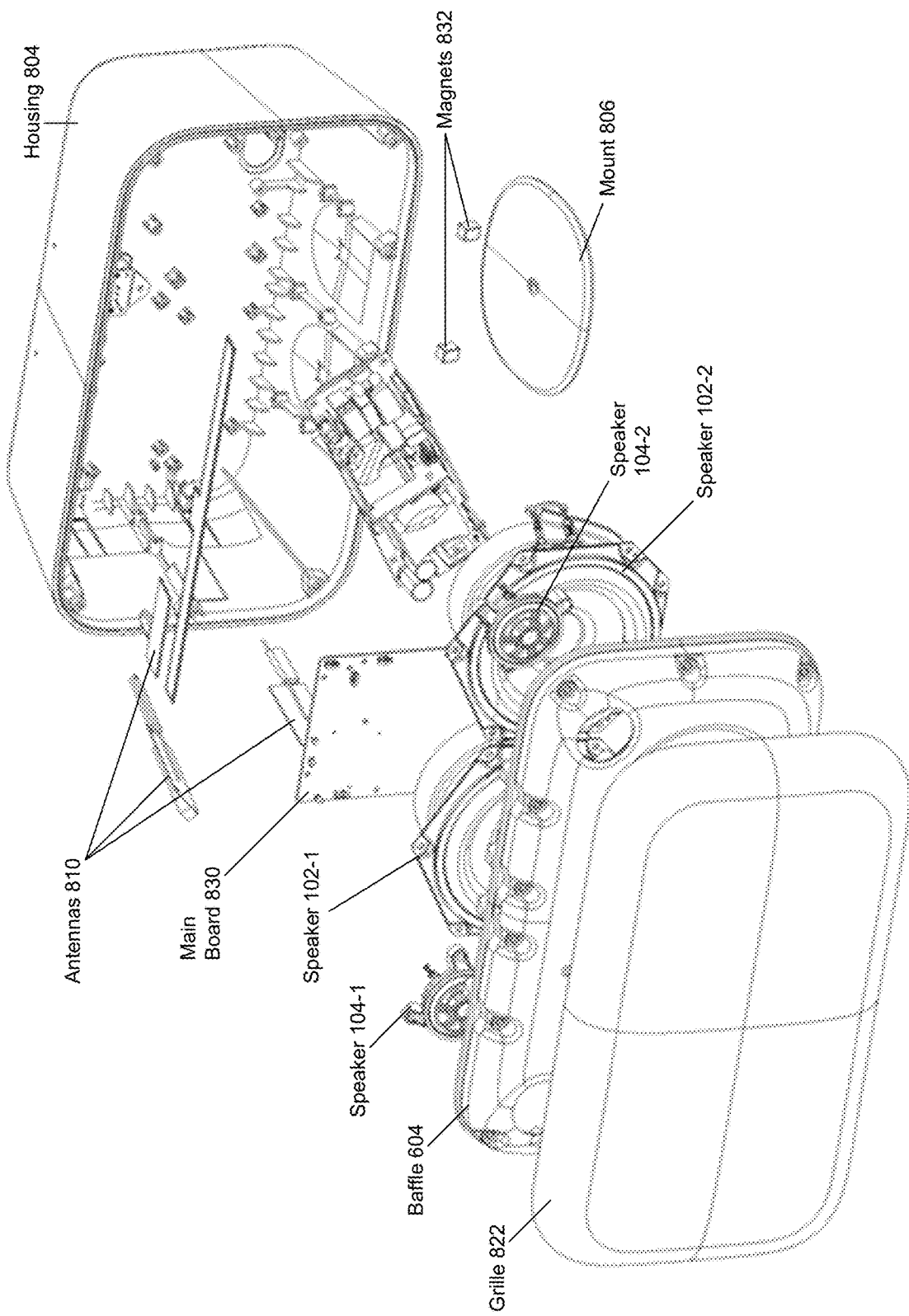

In some implementations, the audio device includes a power port; and the audio device is configured such that the power port is in proximity to a resting surface for the audio device in both the first orientation and the second orientation. For example, the power port is in a corner section of the audio device between the two sides used for resting the audio device in the two orientations, e.g., as shown in FIG. 8B.

In some implementations, the audio device includes one or more antennas (e.g., the antennas 810); and the audio device is configured such that the antennas maintain at least a threshold distance from a resting surface for the audio device in both the first orientation and the second orientation. For example, the antenna(s) are arranged opposite the two sides used for resting the audio device in the two orientations, as shown in FIG. 8A.

In some implementations, the audio device detects a change in orientation of the audio device from the first orientation to a third orientation; and, in response to detecting the change in orientation to the third orientation, presenting an error state to the user. For example, outputting an audio message "the device is upside down" via the one or more speakers, displaying an error state via one or more LEDs of the device, and/or sending an error alert to a client device of the user.

In some implementations, the audio device detects a change in orientation of the audio device from the second orientation to the first orientation. For example, the audio device detects a change from the vertical orientation back to the horizontal orientation and reconfigures the device interface elements accordingly.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not the same type of electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method performed at an audio device having one or more processors, memory, and a plurality of device interface elements that include a volume control element positioned on a predefined side of the audio device, one or more speakers, and a plurality of microphones, the method comprising:
   detecting a first change in orientation of the audio device from a first orientation to a second orientation, wherein:
      the first orientation corresponds to the audio device being positioned on a first side of the audio device;
      the second orientation corresponds to the audio device being positioned on a second side of the audio device, distinct from the first side; and
      while in the first orientation, movement along the volume control element toward a first end of the volume control element corresponds to increasing volume of the one or more speakers;
   based on the first change in orientation, configuring operation of two or more of the plurality of device interface elements, including configuring the volume control element so that movement along the volume control element toward the first end of the volume control element corresponds to decreasing the volume of the one or more speakers.

2. The method of claim 1, further comprising, prior to detecting the first change in orientation, operating the audio device in the first orientation; and
   wherein configuring the operation of the two or more device interface elements comprises reconfiguring the operation based on the first change in orientation.

3. The method of claim 1, wherein configuring the operation of two or more of the plurality of device interface elements includes assigning a first microphone of the plurality of microphones to a task based on the first change in orientation.

4. The method of claim 3, further comprising, based on the first change in the orientation, unassigning a second microphone of the plurality of microphones from the task.

5. The method of claim 1, wherein the one or more speakers comprise a plurality of speakers; and
   wherein configuring the operation of two or more of the plurality of device interface elements includes configuring operation of the plurality of speakers.

6. The method of claim 5, wherein, while in the first orientation, the plurality of speakers is configured to operate in a stereo mode; and
   wherein configuring the operation of the plurality of speakers comprises reconfiguring the plurality of speakers to operate in a mono mode.

7. The method of claim 6, wherein reconfiguring the plurality of speakers to operate in a mono mode comprises utilizing only a subset of the plurality of speakers for a subsequent audio output.

8. The method of claim 5, wherein configuring the operation of the plurality of speakers comprises utilizing only a subset of the plurality of speakers for subsequent audio output having an audio frequency above a threshold frequency.

9. The method of claim 5, wherein configuring the operation of the plurality of speakers comprises:
   utilizing only a subset of the plurality of speakers for subsequent audio output while a volume setting of the audio device is below a volume threshold; and
   utilizing the subset and one or more additional speakers of the plurality of speakers for subsequent audio output while the volume setting of the audio device is above the volume threshold.

10. The method of claim 5, further comprising audio-pairing the audio device with an additional audio device; and
    wherein configuring the operation of the plurality of speakers comprising utilizing a first subset of the plurality of speakers while in the first orientation and utilizing a second subset of the plurality of speakers while in the second orientation.

11. An audio device, comprising:
    a plurality of dedicated physical device interface elements having fixed locations on the audio device, the plurality of device interface elements including:
       a first element comprising a volume control element positioned on a predefined side of the audio device;
       a second element comprising one or more speakers; and
       a third element comprising a plurality of microphones;
    one or more processors; and
    memory coupled to the one or more processors, the memory storing one or more programs configured to be executed by the one or more processors, the one or more programs including instructions for:
       detecting a first change in orientation of the audio device from a first orientation to a second orientation, wherein:
          the first orientation corresponds to the audio device being positioned on a first side of the audio device;
          the second orientation corresponds to the audio device being positioned on a second side of the audio device, distinct from the first side; and
          while in the first orientation, movement along the volume control element toward a first end of the volume control element corresponds to increasing volume of the one or more speakers;
       based on the first change in orientation, configuring operation of two or more of the plurality of device interface elements, including configuring the volume control element so that movement along the volume control element toward the first end of the volume control element corresponds to decreasing the volume of the one or more speakers.

12. The audio device of claim 11, the one or more programs including instructions for:
    detecting a second change in orientation of the audio device from the first orientation to a third orientation, wherein the third orientation corresponds to the audio device being positioned on a third side of the audio device, distinct from the first side; and
    based on the second change in orientation to the third orientation, presenting an error message to a user of the audio device.

13. The audio device of claim 11, wherein the instructions for configuring the operation of two or more of the plurality of device interface elements includes instructions for configuring operation of the volume control element.

14. A non-transitory computer-readable storage medium storing one or more programs, the one or more programs comprising instructions, which when executed by an audio device having one or more processors, memory, and a plurality of device interface elements that include a volume control element positioned on a predefined side of the audio device, one or more speakers, and a plurality of microphones, cause the audio device to:
    detect a first change in orientation of the audio device from a first orientation to a second orientation, wherein:

the first orientation corresponds to the audio device being positioned on a first side of the audio device;

the second orientation corresponds to the audio device being positioned on a second side of the audio device, distinct from the first side; and while in the first orientation, movement along the volume control element toward a first end of the volume control element corresponds to increasing volume of the one or more speakers;

based on the first change in orientation, configure operation of two or more of the plurality of device interface elements, including configuring the volume control element so that movement along the volume control element toward the first end of the volume control element corresponds to decreasing the volume of the one or more speakers.

15. The non-transitory computer-readable storage medium of claim 14, wherein the plurality of device interface elements includes a plurality of lighting elements; and wherein configuring the operation of two or more of the plurality of device interface elements includes adjusting operation of the plurality of lighting elements.

16. The non-transitory computer-readable storage medium of claim 14, wherein the audio device further comprises a detachable mount; and wherein the detachable mount is configured to couple to two or more sides of the audio device to facilitate positioning the audio device in multiple orientations.

17. The non-transitory computer-readable storage medium of claim 14, wherein the audio device further comprises a power port; and wherein the audio device is configured such that the power port is in proximity to a resting surface for the audio device in both the first orientation and the second orientation.

18. The non-transitory computer-readable storage medium of claim 14, wherein the audio device further comprises one or more antennas; and wherein the audio device is configured such that the antennas maintain at least a threshold distance from a resting surface for the audio device in both the first orientation and the second orientation.

19. The method of claim 1, further comprising:

detecting a second change in orientation of the audio device from the first orientation to a third orientation, wherein the third orientation corresponds to the audio device being positioned on a third side of the audio device, distinct from the first side; and based on the second change in orientation, presenting an error message to a user of the audio device.

20. The non-transitory computer-readable storage medium of claim 14, the one or more programs further comprising instructions, which when executed by the audio device, cause the audio device to:

detect a second change in orientation of the audio device from the first orientation to a third orientation, wherein the third orientation corresponds to the audio device being positioned on a third side of the audio device, distinct from the first side; and based on the second change in orientation, present an error message to a user of the audio device.

* * * * *